United States Patent

Nakayama et al.

[11] Patent Number: 5,936,916
[45] Date of Patent: *Aug. 10, 1999

[54] MAGNETO-OPTICAL RECORDING MEDIUM WITH MULTIPLE MAGNETIC LAYERS AND METHODS RELATED THERETO

[75] Inventors: Junichiro Nakayama; Michinobu Mieda, both of Shiki-gun; Junji Hirokane; Akira Takahashi, both of Nara, all of Japan

[73] Assignee: Sharp Kabushiki Kaisha, Osaka, Japan

[*] Notice: This patent is subject to a terminal disclaimer.

[21] Appl. No.: 09/018,267

[22] Filed: Feb. 4, 1998

Related U.S. Application Data

[63] Continuation of application No. 08/766,015, Dec. 13, 1996, Pat. No. 5,787,056.

[30] Foreign Application Priority Data

Dec. 19, 1995 [JP] Japan ..................................... 7-330508

[51] Int. Cl.$^6$ ............................. G11B 11/00; G11B 5/66
[52] U.S. Cl. .................................... 369/13; 428/694 ML; 428/694 EC
[58] Field of Search ............................ 369/13, 288, 286, 369/110, 116, 124, 122, 275.2, 275.3, 14, 275.1, 121, 54; 428/694 ML, 694 EC, 694 MM, 694 MT; 360/59

[56] References Cited

U.S. PATENT DOCUMENTS

| | | | |
|---|---|---|---|
| 5,164,926 | 11/1992 | Matsumoto | 369/13 |
| 5,208,797 | 5/1993 | Nakaki et al. | 369/100 |
| 5,258,237 | 11/1993 | Nakaki et al. | 428/694 EC |
| 5,554,436 | 9/1996 | Katayama et al. | 428/212 |
| 5,596,555 | 1/1997 | Osato et al. | 369/13 |
| 5,604,046 | 2/1997 | Osato | 369/13 X |
| 5,627,803 | 5/1997 | Negishi | 369/13 |
| 5,644,566 | 7/1997 | Nakayama et al. | 369/275.2 |
| 5,768,218 | 6/1998 | Nakayama et al. | 369/13 |
| 5,787,056 | 7/1998 | Nakayama et al. | 369/13 |

FOREIGN PATENT DOCUMENTS 7-161082  6/1995  Japan .

OTHER PUBLICATIONS

J. Nakayama, et al., "Direct Overwriting Using Magnetooptical Trilayer Medium and One Magnet", *Jpn J. Appl. Phys.* vol. 32, Part 1, No. 11B, pp. 5439–5440, Noveme.

*Primary Examiner*—Ali Neyzari
*Attorney, Agent, or Firm*—David Conlin; William J. Daley, Jr.

[57] ABSTRACT

If the Curie points of the first magnetic layer, second magnetic layer, third magnetic layer and fourth magnetic layer of alloys of rare-earth metal and transition metal as ferrimagnetic materials showing perpendicular magnetization from room temperature to their Curie points are indicated as Tc1, Tc2, Tc3 and Tc4, respectively, the Curie points and room temperature are related by: room temperature<Tc3<Tc4<Tc1<Tc2. If the sublattice magnetization of transition metal is indicated as $\alpha$ and the sublattice magnetization of rare-earth metal is $\beta$, $\alpha$ is stronger than $\beta$ in the second magnetic layer at temperatures between Tc1 and Tc2, and $\beta$ is stronger than $\alpha$ in the fourth magnetic layer at temperatures between room temperature and Tc4. This structure enables light-intensity modulation overwriting, eliminates the necessity of orienting the magnetization of magnetic layers in one direction using a great magnetic field or high laser power before shipment from factories or before recording, and reduces an increase in the cost of manufacturing a magneto-optical recording medium and a device for recording information on the magneto-optical medium.

10 Claims, 12 Drawing Sheets

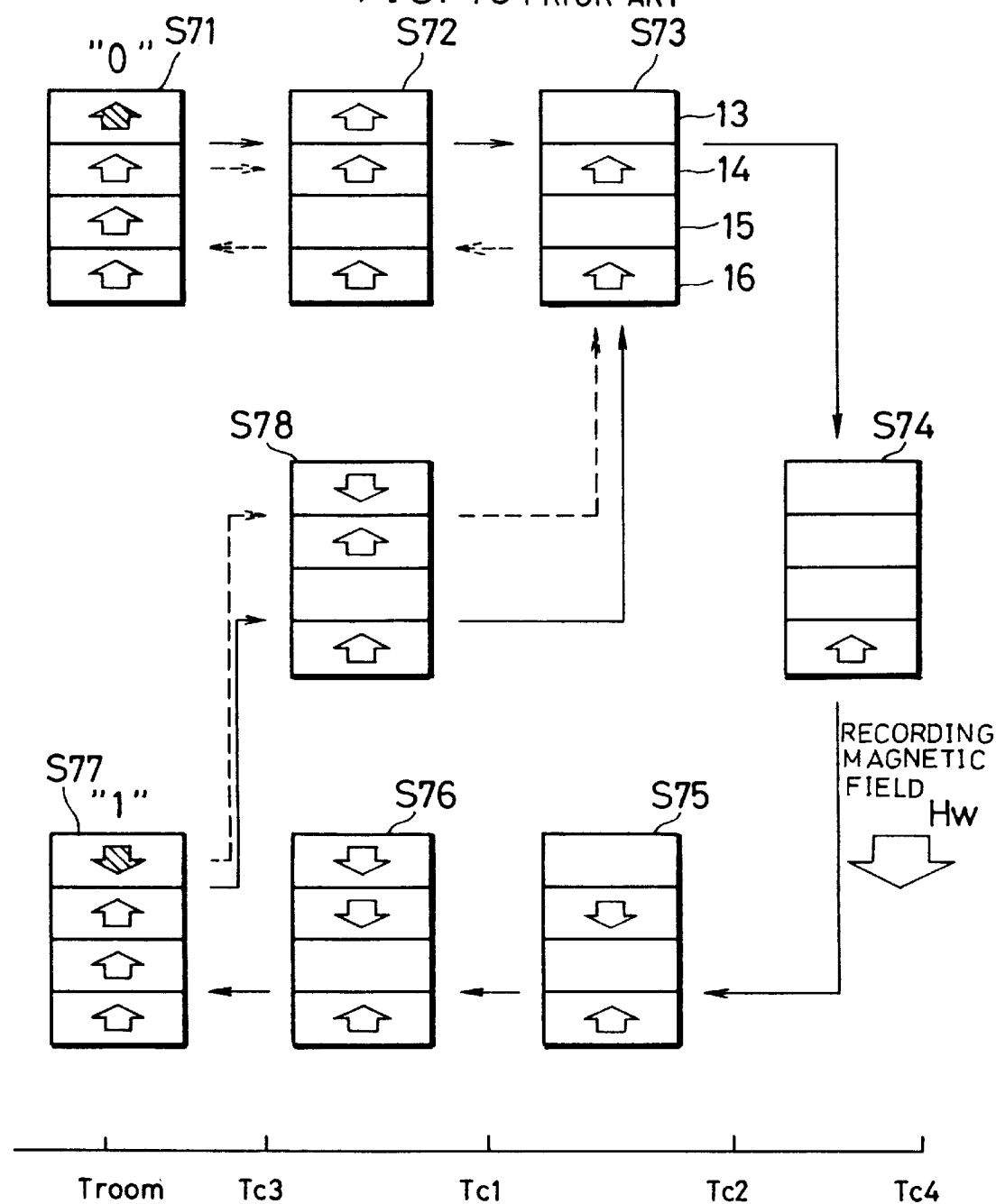

MAGNETO-OPTICAL RECORDING MEDIUM WITH MULTIPLE MAGNETIC LAYERS AND METHODS RELATED THERETO

This application is a continuation of U.S. application Ser. No. 08/766,015, filed Dec. 13, 1996, now U.S. Pat. No. 5,787,056 the teachings of which are incorporated herein by reference.

FIELD OF THE INVENTION

The present invention relates to a magneto-optical recording medium and a magneto-optical recording method used for optical disks, optical cards and the like, for optically performing at least recording, reproducing or erasing of information.

BACKGROUND OF THE INVENTION

A magneto-optical recording system uses a recording medium formed by depositing a perpendicularly magnetized film made of a magnetic material on a substrate, and performs recording and reproducing operations in the manner mentioned below.

In order to perform recording, the recording medium is initialized by, for example, a strong external magnetic field, and the direction of magnetization is oriented in one direction (upward or downward direction). Thereafter, a desired recording area is irradiated with a laser beam to increase the temperature of the medium in the area to at least near its Curie point or compensation point so that the coercive force (Hc) in the area becomes zero or substantially zero. Subsequently, an external magnetic field (bias magnetic field) opposite to the initialized magnetization direction is applied to reverse the magnetization direction. When the irradiation of the laser beam is stopped, the recording medium returns to ordinary temperature, and the reversed magnetization is fixed. Thus, information is thermomagnetically recorded.

In order to perform reproduction, the recording medium is irradiated with a linearly polarized laser beam, and information is optically read using such phenomena that the plane of polarization of light reflected from or transmitted through the recording medium is rotated (Kerr magnetic effect and Faraday magnetic effect).

The magneto-optical recording system has been focused as a rewritable large-capacity memory element. As a system for reusing (rewriting) the recording medium, a so-called light-intensity modulation overwritable medium was proposed. The light-intensity modulation overwritable medium enables overwriting by using an exchange-coupled-two-layer film, an initialization magnetic field (Hi) and a recording magnetic field (Hw) and by performing light-intensity modulation. Further, a light-intensity modulation overwritable medium of another type was also proposed. This light-intensity modulation overwritable medium includes an exchanged-coupled-four-layer film, and performs overwriting without using an initializing magnetic field (Hi).

Referring now to FIGS. 16 to 18, the following description will briefly explain the process of light-intensity modulation overwriting using the light-intensity modulation overwritable medium which includes the exchange-coupled four-layer film and requires no initializing magnetic field Hi.

As illustrated in FIG. 16, the light-intensity modulation overwritable medium includes a first magnetic layer 13, a second magnetic layer 14, a third magnetic layer 15, and a fourth magnetic layer 16. The temperature dependence of the coercive forces of these magnetic layers is shown in FIG. 17.

Next, the changes in the magnetization state of each magnetic layer will be explained with reference to FIG. 18. The arrows in FIG. 18 show the magnetization direction of transition metal.

At room temperature, information is recorded depending on whether the magnetization direction of the first magnetic layer 13 is upward "0" (state S71) or downward "1" (state S77). The magnetization of the fourth magnetic layer 16 is always oriented in one direction (an upward direction in FIG. 18), and the magnetization of the second magnetic layer 14 is oriented in the same direction as that of the fourth magnetic layer 16 through the third magnetic layer 15.

Recording is performed by irradiating laser light whose intensity has been modulated to high power or low power while applying the recording magnetic field Hw.

The high power and low power are set so that the medium is heated to a temperature near Curie point Tc2 of the second magnetic layer 14 (state S74) when laser light of high power is irradiated, and heated to a temperature near Curie point Tc1 of the first magnetic layer 13 (state S73) when laser light of low power is irradiated.

Therefore, when the laser light of high power is irradiated, the magnetization of the second magnetic layer 14 is switched to a downward direction by the recording magnetic field Hw (state S75), and copied to the first magnetic layer 13 by an exchange force acting on the interface during a cooling process (state S76). Then, the magnetization of the second magnetic layer 14 is oriented in the same direction as that of the fourth magnetic layer 16 (state S77). As a result, the first magnetic layer 13 shows the downward magnetization direction "1".

On the other hand, when the laser light of low power is irradiated, the magnetization of the second magnetic layer 14 is not switched by the recording magnetic field Hw because its coercive force is stronger than the recording magnetic field Hw (state S73). Similarly to the above case, the magnetization direction of the first magnetic layer 13 is aligned with the magnetization direction of the second magnetic layer 14 by the exchange force acting on the interface during the cooling process (state S72). Therefore, the first magnetic layer 13 shows the upward magnetization direction "0" (state S71).

The laser power used for reproduction is set to a level much lower than the low power for recording.

Hence, the above-mentioned conventional technique uses an exchanged-coupled-four-layer film, and provides a magneto-optical recording medium capable of being overwritable by light-intensity modulation without requiring the initializing magnetic field Hi and of achieving stable recording bits.

In this conventional technique, however, it is necessary to orient the magnetization of the fourth magnetic layer 16 in one direction using a large magnetic field or high laser power before shipping from factories or before recording. Consequently, the conventional technique suffers from such a drawback that the costs of manufacturing the magneto-optical recording medium and a device for recording information on the medium increase.

Moreover, if the direction of the magnetization of the fourth magnetic layer 16 which has been oriented in one direction is disordered for some reasons, light-intensity modulation overwriting cannot be carried out.

SUMMARY OF THE INVENTION

It is an object of the present invention to provide a magneto-optical recording medium capable of achieving light-intensity modulation overwriting, eliminating the necessity of orienting the magnetization of magnetic layers in one direction using a great magnetic field (initializing magnetic field) or high laser power before shipment from factories or before recording and of reducing an increase in the cost of manufacturing the magneto-optical recording medium and a device for recording information on the magneto-optical medium.

In order to achieve the above object, a first magneto-optical recording medium of the present invention includes a first magnetic layer, a second magnetic layer and a fourth magnetic layer having Curie points Tc1, Tc2 and Tc4, respectively, and showing perpendicular magnetization from room temperature to Tc1, Tc2 and Tc4, the first, second and fourth magnetic layers being arranged in this order, the direction of magnetization of the second magnetic layer being copied to the first magnetic layer by an exchange force at temperatures between room temperature and Tc1, the direction of magnetization of the fourth magnetic layer being copied to the second magnetic layer by an exchange force but the magnetization of the second magnetic layer is not copied to the first magnetic layer in a predetermined temperature range R between room temperature and Tc4, room temperature, Tc1, Tc2 and Tc4 being related by room temperature<Tc4<Tc1<Tc2.

A second magneto-optical recording medium of the present invention is based on the first magneto-optical recording medium, and is characterized in that the second and fourth magnetic layers are made of alloys of rare-earth metal and transition metal as ferrimagnetic materials, if sublattice magnetization of one of the transition metal and the rare-earth metal is indicated as a and the other is $\beta$, $\alpha$ is stronger than $\beta$ in the second magnetic layer at temperatures between Tc1 and Tc2, and $\beta$ is stronger than $\alpha$ in the fourth magnetic layer at temperatures between room temperature and Tc4.

A magneto-optical recording method of the present invention uses the magneto-optical recording medium of the present invention and is characterized in that a low process of irradiating a light beam of low level for heating the magneto-optical recording medium to a temperature near Tc1 and a high process of irradiating a light beam of high level for heating the magneto-optical recording medium to at least a temperature near Tc2 are performed while applying a recording magnetic field Hw smaller than the coercive force of the second magnetic layer at temperature below Tc1.

In this structure and method, recording is performed according to the following low process and high process for irradiating light beams of two levels of intensity, high and low levels. Here, in the upward and downward directions perpendicular to the respective layers, if the direction of magnetization of the second magnetic layer before heated is indicated as A and the opposite direction is B, the recording magnetic field Hw is applied in the B direction.

The low process is performed as follows.

The respective layers are heated to temperatures near Tc1 so as to extinguish the magnetization of each of the first and fourth magnetic layers. At this time, since the coercive force of the second magnetic layer is greater than the recording magnetic field Hw, the magnetization of the second magnetic layer is not reversed. Moreover, since $\alpha$ is stronger than $\beta$ in the second magnetic layer, $\alpha$ is oriented in the A direction.

The respective layers are cooled down to temperatures between Tc4 and Tc1 so as to copy the direction of each sublattice magnetization of the second magnetic layer to the first magnetic layer by the exchange force. As a result, in the first magnetic layer, $\alpha$ is oriented in the A direction and $\beta$ is oriented in the B direction.

The respective layers are cooled down to temperatures in the above-mentioned temperature range R so as to orient the magnetization of the fourth magnetic layer in the B direction by the recording magnetic field Hw. At this time, since $\beta$ is stronger than $\alpha$ in the fourth magnetic layer, $\beta$ is oriented in the B direction.

The high process is performed as follows.

The respective layers are heated to temperatures near Tc2 so as to extinguish the magnetization of all of the magnetic layers.

The respective layers are cooled down to temperatures between Tc1 and Tc2. Since the magnetization of the second magnetic layer has been temporarily extinguished, in contrast with the low process, the direction of the second magnetic layer is oriented in the B direction by the recording magnetic field Hw. At this time, since $\alpha$ is stronger than $\beta$ in the second magnetic layer, $\alpha$ is oriented in the B direction.

The respective layers are cooled down to temperatures between Tc4 and Tc1 so as copy each sublattice magnetization of the second magnetic layer to the first magnetic layer by the exchange force. As a result, in the first magnetic layer, $\alpha$ is oriented in the B direction and $\beta$ is oriented in the A direction.

The respective layers are cooled down to temperatures in the above-mentioned temperature range R so as to orient the magnetization of the fourth magnetic layer in the B direction by the recording magnetic field Hw. At this time, since $\beta$ is stronger than $\alpha$ in the fourth magnetic layer, $\beta$ is oriented in the B direction. Each sublattice magnetization of the fourth magnetic layer is copied to the second magnetic layer by the exchange force. As a result, in the second magnetic layer, $\alpha$ is oriented in the A direction and $\beta$ is oriented in the B direction like the fourth magnetic layer. Thus, the direction of the magnetization of the second magnetic layer is initialized. At this time, each sublattice magnetization of the second magnetic layer is not copied to the first magnetic layer by the exchange force.

As described above, in the first magnetic layer, $\alpha$ is oriented in the A direction and $\beta$ is oriented in the B direction by the low process. On the other hand, when the high process is performed, $\alpha$ is oriented in the B direction and $\beta$ is oriented in the A direction in the first magnetic layer. Namely, light-intensity overwriting can be performed.

As known from the above explanation, the magnetization of the fourth magnetic layer can be oriented in a predetermined one direction, i.e., initialized, by the recording magnetic field Hw before the direction of the magnetization of the second magnetic layer is initialized. More specifically, even if the magnetization of the fourth magnetic layer is temporarily extinguished with a rise in temperature, the initial magnetization direction is restored before the initialization of the direction of the magnetization of the second magnetic layer.

Therefore, the direction of the magnetization of the fourth magnetic layer can be controlled by a recording magnetic field that is a small magnetic field for recording without using a great magnetic field like a conventional initializing magnetic field and by a light beam power weaker than a conventional power.

Accordingly, it is possible to achieve light-intensity modulation overwriting, eliminate the necessity of orienting the magnetization of magnetic layers in one direction using a great magnetic field (initializing magnetic field) or high laser power before shipment from factories or before recording, and reduce an increase in the cost of manufacturing the magneto-optical recording medium and a device for recording information on the magneto-optical medium.

Moreover, even when the direction of the magnetization of the fourth magnetic layer is disordered for some reasons, it is possible to perform light-intensity modulation overwriting.

In addition to the above-mentioned first structure, the second magneto-optical recording medium of the present invention is characterized in that a third magnetic layer is provided between the second magnetic layer and the fourth magnetic layer, third magnetic layer showing perpendicular magnetization from room temperature to its Curie point Tc3, Tc3 being related to room temperature and Tc4 by $$\text{room temperature} < Tc3 < Tc4,$$

the temperature range R is a range between room temperature and Tc3, and the magnetization of the fourth magnetic layer is copied to the third magnetic layer by an exchange force and the magnetization of the third magnetic layer is copied to the second magnetic layer by an exchange force in the temperature range R.

In this structure, like the first structure, recording is performed according to the following low process and high process of irradiating light beams of two levels of intensity, high and low levels. Here, similarly to the above explanation, in the upward and downward directions perpendicular to the respective layers, if the direction of magnetization of the second magnetic layer before heated is indicated as A and the opposite direction is B, the recording magnetic field Hw is applied in the B direction.

The low process is performed as follows.

The respective layers are heated to temperatures near Tc1 so as to extinguish the magnetization of each of the first, third and fourth magnetic layers. At this time, since the coercive force of the second magnetic layer is greater than the recording magnetic field Hw, the magnetization of the second magnetic layer is not reversed. Moreover, since $\alpha$ is stronger than $\beta$ in the second magnetic layer, $\alpha$ is oriented in the A direction.

The respective layers are cooled down to temperatures between Tc4 and Tc1 so as to copy the direction of each sublattice magnetization of the second magnetic layer to the first magnetic layer by the exchange force. As a result, in the first magnetic layer, $\alpha$ is oriented in the A direction and $\beta$ is oriented in the B direction.

The respective layers are cooled down to temperatures between Tc3 and Tc4 so as to orient the magnetization of the fourth magnetic layer in the B direction by the recording magnetic field Hw. At this time, since $\beta$ is stronger than $\alpha$ in the fourth magnetic layer, $\beta$ is oriented in the B direction.

The respective layers are cooled down to temperatures below Tc3 so as to copy each sublattice magnetization of the fourth magnetic layer to the third magnetic layer by the exchange force.

The high process is performed as follows.

The respective layers are heated to temperatures near Tc2 so as to extinguish the magnetization of all of the magnetic layers.

The respective layers are cooled down to temperatures between Tc1 and Tc2. Since the magnetization of the second magnetic layer has been temporarily extinguished, in contrast with the low process, the direction of the second magnetic layer is oriented in the B direction by the recording magnetic field Hw. At this time, since $\alpha$ is stronger than $\beta$ in the second magnetic layer, $\alpha$ is oriented in the B direction.

The respective layers are cooled down to temperatures between Tc4 and Tc1 so as copy each sublattice magnetization of the second magnetic layer to the first magnetic layer. As a result, in the first magnetic layer, $\alpha$ is oriented in the B direction and $\beta$ is oriented in the A direction.

The respective layers are cooled down to temperatures between Tc3 and Tc4 so as to orient the magnetization of the fourth magnetic layer in the B direction by the recording magnetic field Hw. At this time, since $\beta$ is stronger than $\alpha$ in the fourth magnetic layer, $\beta$ is oriented in the B direction.

The respective layers are cooled down to temperatures below Tc3 so as to copy each sublattice magnetization of the fourth magnetic layer to the third magnetic layer by the exchange force. Each sublattice magnetization of the third magnetic layer is copied to the second magnetic layer by the exchange force. Therefore, in the second magnetic layer, $\alpha$ is oriented in the A direction and $\beta$ is oriented in the B direction like the fourth magnetic layer. Thus, the direction of the magnetization of the second magnetic layer is initialized. At this time, each sublattice magnetization of the second magnetic layer is not copied to the first magnetic layer by the exchange force.

As described above, like the above-mentioned first structure, in the first magnetic layer, $\alpha$ is oriented in the A direction and $\beta$ is oriented in the B direction by the low process. On the other hand, when the high process is performed, $\alpha$ is oriented in the B direction and $\beta$ is oriented in the A direction in the first magnetic layer. Namely, light-intensity overwriting can be performed.

Moreover, since the third magnetic layer is provided between the second magnetic layer and the fourth magnetic layer, when the coercive force of the first magnetic layer is not sufficiently strong in the temperature range R in the course of lowering of the temperature of the magnetic layers, it is possible to prevent the magnetization of the fourth magnetic layer from being copied to the first magnetic layer through the second magnetic layer by the exchange force from the fourth magnetic layer. Consequently, the first magnetic layer can be selected from a wider range of materials.

In addition to the above-mentioned first or second structure, the third magneto-optical recording medium of the present invention is characterized in that the sublattice magnetization of the rare-earth metal is stronger than the sublattice magnetization of the transition metal at room temperature and the sublattice magnetization of the transition metal is stronger than the sublattice magnetization of the rare-earth metal at temperatures between Tc1 and Tc2 in the second magnetic layer, and the sublattice magnetization of the rare-earth metal is stronger than the sublattice magnetization of the transition metal at temperatures between room temperature and Tc4 in the fourth magnetic layer.

In this structure, when the temperature is lowered to room temperature, since the sublattice magnetization of the rare-earth metal of the fourth magnetic layer is oriented in the B direction by the recording magnetic field Hw, the sublattice magnetization of the transition metal is oriented in the A direction. Therefore, the fourth magnetic layer in the structure of claim 1, and the fourth and third magnetic layers in the structure of claim 2 act for orienting the sublattice magnetization of the transition metal of the second magnetic layer in the A direction by the exchange force.

On the other hand, the recording magnetic field Hw is exerted in a direction so that the magnetization of the second magnetic layer is oriented in the B direction. Therefore, the recording magnetic field acts for orienting the sublattice magnetization of the rare-earth metal of the second magnetic layer in the B direction. In other words, the recording magnetic field acts for orienting the sublattice magnetization of the transition metal of the second magnetic layer in the A direction.

Thus, since the above-mentioned two actions are combined, the requirements for the recording magnetic field and the magnetic layers are eased. Namely, it is possible to decrease the strength of the recording magnetic field and the strength of the exchange forces of the fourth and third magnetic layers exerted on the second magnetic layer. As a result, the materials used for the magneto-optical disk can be selected from a wider range, and the increase in the cost of manufacturing a device for recording information on the medium can be further reduced.

In addition to the above-mentioned first, second or third structure, the fourth magneto-optical recording medium of the present invention is characterized in that the fifth magnetic layer having Curie point Tc5 higher than the Curie point Tc1 of the first magnetic layer is formed on a side of the first magnetic layer, opposite to a side whereupon the second magnetic layer is formed.

In this structure, since the Curie point of the fifth magnetic layer is higher than the Curie point of the first magnetic layer, the Kerr rotation angle becomes greater when performing reproduction. As a result, the signal quality is improved.

In addition to any of the above-mentioned structures 1 to 4, the fifth magneto-optical recording medium of the present invention is characterized in that a sixth magnetic layer showing in-plane magnetization at room temperature and perpendicular magnetization at a temperature near Tc1 is provided between the first magnetic layer and the second magnetic layer.

In this structure, since the sixth magnetic layer shows perpendicular magnetization at a temperature near Tc1, the magnetization is efficiently copied from the second magnetic layer to the first magnetic layer. Additionally, since the sixth magnetic layer shows in-plane magnetization at room temperature, the magnetization of the first magnetic layer that recorded information is not affected by the exchange force from the second magnetic layer at room temperature. It is therefore possible to improve the recording sensitivity. As a result, high-quality light-intensity modulation overwriting can be performed.

For a fuller understanding of the nature and advantages of the invention, reference should be made to the ensuing detailed description taken in conjunction with the accompanying drawings.

BRIEF DESCRIPTION OF THE DRAWINGS

FIG. 18 is an explanatory view showing the magnetic states of the first to fourth magnetic layers to explain the recording process on the conventional magneto-optical disk.

DETAILED DESCRIPTION OF THE PREFERRED EMBODIMENTS

Embodiment 1

Figure 1:
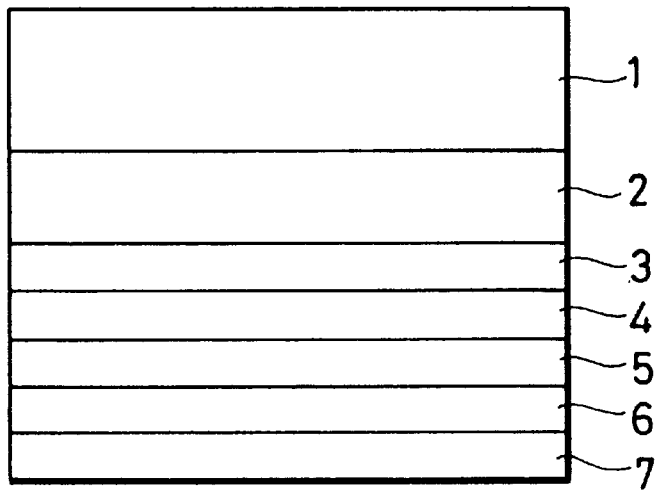
FIG. 1 is an explanatory view showing an example of the structure of a magneto-optical disk of the present invention.
Figure 2:
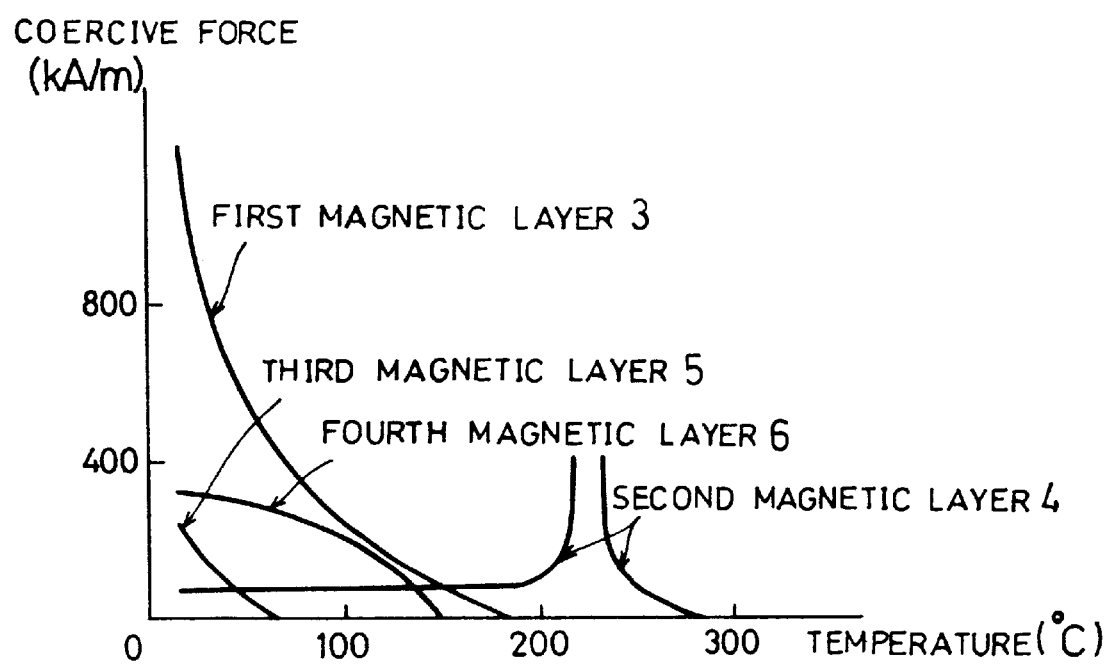
FIG. 2 is a graph showing the temperature dependence of the coercive forces of the first to fourth magnetic layers of the magneto-optical disk shown in FIG. 1.
Figure 3:
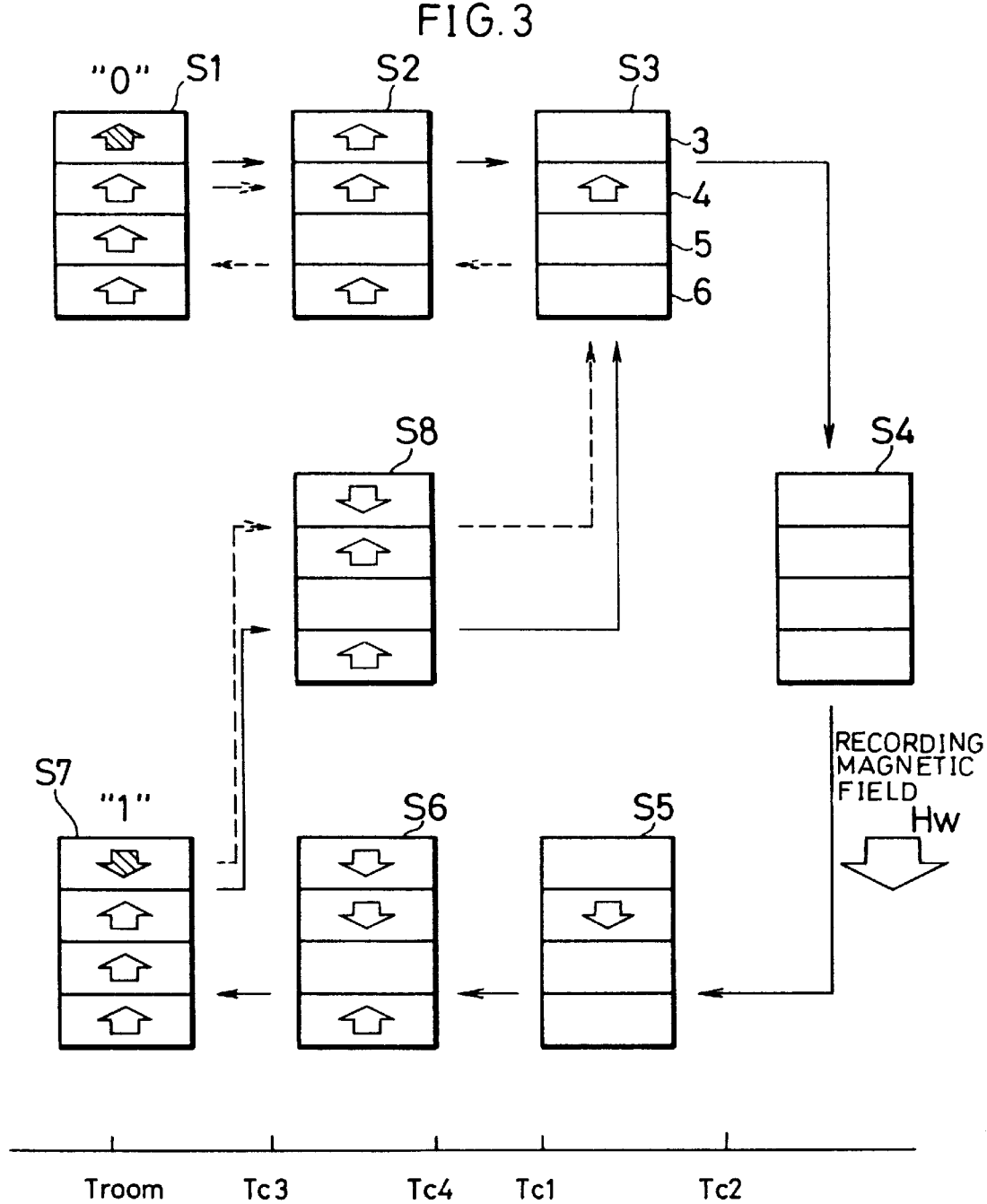
FIG. 3 is an explanatory view showing the magnetic states of the first to fourth magnetic layers to explain the recording process on the magneto-optical disk shown in FIG. 1.

The following description will discuss one embodiment of the present invention with reference to FIGS. 1 to 3.

As illustrated in FIG. 1, a magneto-optical disk (magneto-optical recording medium) of this embodiment includes a transparent dielectric layer 2, a first magnetic layer 3, a second magnetic layer 4, a third magnetic layer 5, a fourth magnetic layer 6, and a protective layer 7, formed in this order on a light transmitting substrate 1. Actually, an overcoat film (not shown) is formed outside of the protective layer 7. The first magnetic layer 3, second magnetic layer 4, third magnetic layer 5, and fourth magnetic layer 6 are made of alloys of rare-earth metal and transition metal as ferrimagnetic materials in which the magnetization of rare-earth metal and that of transition metal are anti-parallel to each other.

As illustrated in FIG. 2, the first magnetic layer 3 has a lower Curie point, Tc1, and a higher coercive force, Hc1, at room temperature compared to the second magnetic layer 4, and shows perpendicular magnetization from room temperature to Tc1. The composition of the first magnetic layer 3 is such that it is transition metal rich at room temperature.

The second magnetic layer 4 has a Curie point, Tc2, higher than the Curie point Tc1 of the first magnetic layer 3, and shows perpendicular magnetization from room temperature to Tc2. The composition of the second magnetic layer 4 is such that it is rare-earth metal rich at room temperature and has a compensation point between room temperature and Tc2, and that it is transition metal rich between the compensation point and Tc2.

The third magnetic layer 5 has the lowest Curie point, Tc3, among the first to fourth magnetic layers, and shows perpendicular magnetization from room temperature to Tc3. The composition of the third magnetic layer 5 is such that it is transition metal rich at room temperature.

The fourth magnetic layer 6 has a Curie point, Tc4, which is higher than Tc3 and lower than Tc1, and shows perpendicular magnetization between room temperature and Tc4. The composition of the fourth magnetic layer 6 is such that it is rare-earth metal rich at room temperature and does not have a compensation point between room temperature and Tc4.

Next, the recording process in this embodiment will be discussed with reference to FIG. 3. FIG. 3 shows the magnetization states of the first magnetic layer 2, second magnetic layer 4, third magnetic layer 5, and fourth magnetic layer 6. The horizontal axis in FIG. 3 indicates temperature. Since each layer is formed by an alloy of rare-earth metal and transition metal, the total magnetization, sublattice magnetization $\alpha$ of the transition metal, and sublattice magnetization $\beta$ of the rare-earth metal are present. The arrows shown in FIG. 3 indicate the direction of the sublattice magnetization $\alpha$ of the transition metal of each layer.

When performing light-intensity modulation overwriting using such a magneto-optical disk, information is rewritten using an overwriting technique in which a high process and low process are repeatedly performed by modulating the intensity of a light beam according to information while applying the recording magnetic field Hw to a portion irradiated with the light beam. In the high process, the portion irradiated with the light beam is heated to a temperature near Tc2. In the low process, the portion irradiated with the light beam is heated to a temperature near Tc1.

At room temperature, two stable states, "0" (upward magnetization) and "1" (downward magnetization), are present depending on the direction of the sublattice magnetization of the first magnetic layer 3. These states are S1 and S7 shown in FIG. 3.

In the high process, laser light of high power (Ph) is irradiated. As a result, the temperature of the irradiated portion is increased to a temperature near Tc2, and the magnetizations of the first magnetic layer 3, third magnetic layer 5, and fourth magnetic layer 6 become zero. At this time, the magnetization of the second magnetic layer 4 becomes zero, and is then oriented in a downward direction by the recording magnetic field Hw. Since the second magnetic layer 4 is transition metal rich around this temperature, the sublattice magnetization $\alpha$ of the transition metal is oriented in a downward direction (S3, S4 and S5).

When the portion irradiated with the light beam is cooled down by a rotation of the magneto-optical disk, the first magnetic layer 3 shows a magnetization. At this time, the sublattice magnetization of the transition metal of the first magnetic layer 3 is oriented in a downward direction that is the direction of the sublattice magnetization of the transition metal of the second magnetic layer 4 by an exchange force exerted on the first magnetic layer 3 from the second magnetic layer 4 at the interface between the first magnetic layer 3 and the second magnetic layer 4.

When the irradiated portion is further cooled down, the fourth magnetic layer 6 shows a magnetization. At this time, the magnetization of the fourth magnetic layer 6 is oriented in a downward direction by the recording magnetic field Hw. Since the fourth magnetic layer 6 is rare-earth metal rich, the sublattice magnetization $\alpha$ of the transition metal is oriented in an upward direction (S6).

Further, when the irradiated portion is cooled down to a temperature around room temperature, the third magnetic layer 5 shows a magnetization. Therefore, exchange forces acting on the interfaces between the second magnetic layer 4 and the third magnetic layer 5 and between the third magnetic layer 5 and the fourth magnetic layer 6 are generated. The exchange forces orient the sublattice magnetization $\alpha$ of the transition metal of the second magnetic layer 4 in an upward direction that is the same direction as the direction of the sublattice magnetization of the transition metal of the fourth magnetic layer 6. However, the direction of the magnetization of the first magnetic layer 3 is not reversed by the magnetization of the second magnetic layer 4 because the first magnetic layer 3 has a great coercive force at room temperature. Thus, the state "1" (downward magnetization) is recorded on the first magnetic layer 3 (S7).

On the other hand, in the low process, laser light of low power (P1) is irradiated. As a result, the temperature of the irradiated portion is increased to near Tc1. At this time, since the coercive force of the second magnetic layer 4 is stronger than the recording magnetic field Hw, the direction of the magnetization of the second magnetic layer 4 is not reversed by the recording magnetic field Hw. Thus, the orientation of the sublattice magnetization $\alpha$ of the transition metal of the second magnetic layer 4 is kept upward (S3).

When the portion irradiated with the light beam is cooled down by a rotation of the magneto-optical disk, the first magnetic layer 3 shows a magnetization. At this time, the sublattice magnetization of the transition metal of the first magnetic layer 3 is oriented in an upward direction that is the direction of the sublattice magnetization of the transition metal of the second magnetic layer 4 by an exchange force acting on the interface.

When the irradiated portion is further cooled down, the fourth magnetic layer 6 shows a magnetization. At this time, the magnetization of the fourth magnetic layer 6 is oriented in a downward direction by the recording magnetic field Hw. Since the fourth magnetic layer 6 is rare-earth metal rich, the sublattice magnetization $\alpha$ of the transition metal is oriented in an upward direction (S2).

Further, when the irradiated portion is cooled down to near room temperature, the third magnetic layer 5 shows a magnetization. As a result, exchange forces acting on the interfaces between the second magnetic layer 4 and the third magnetic layer 5 and between the third magnetic layer 5 and the fourth magnetic layer 6 are generated. The exchange forces orient the sublattice magnetization $\alpha$ of the transition metal of the second magnetic layer 4 in an upward direction that is the direction of the sublattice magnetization of the transition metal of the fourth magnetic layer 6. However, the magnetization direction of the first magnetic layer 3 is not reversed by the magnetization of the second magnetic layer 4 since the first magnetic layer 3 has a high coercive force at room temperature. Thus, a state "0" (upward magnetization) is recorded on the first magnetic layer 3 (S1).

As described above, the first magnetic layer 3 moves into a state "1" (a downward magnetization) in the case of the high process, and moves into a state "0" (an upward magnetization) in the case of the low process, thereby achieving light-intensity modulation overwriting.

When reproducing information, laser light of reproduction power (Pr) is irradiated, and a rotatory polarization of the reflected light is detected to perform reproduction. However, since the temperature of the irradiated portion is much lower than that in the low process, there is no possibility that the information is erased by the laser light of Pr.

In this embodiment, the second magnetic layer 4 has such a characteristic that it is rare-earth metal rich at room temperature and has its compensation point between room temperature and Tc2, and is transition metal rich at temperatures between Tc1 and Tc2. The fourth magnetic layer 6 is rare-earth metal rich at room temperature and does not have its compensation point between room temperature and Tc2. However, the combination of the second magnetic layer 4 and the fourth magnetic layer 6 is not necessarily limited to the one mentioned above i- the kind of the sublattice magnetization of the second magnetic layer 4 oriented in the direction of the recording magnetic field Hw by the high process and the kind of the sublattice magnetization of the fourth magnetic layer 6 oriented in the direction of the recording magnetic field Hw at temperatures between Tc3 and Tc4 vary. For example, a combination of the second magnetic layer 4 showing perpendicular magnetization and a rare-earth metal rich characteristic between room temperature and the Curie point Tc2 and the fourth magnetic layer 6 showing perpendicular magnetization and a transition metal rich characteristic between room temperature and the Curie point Tc4 may be adopted.

Since this combination is opposite to the above-mentioned combination, the open arrows in FIG. 3 which indicate the direction of the sublattice magnetization of the transition metal in the above explanation need to be considered as indicating the sublattice magnetization of the rare-earth metal in this case. Since the first magnetic layer 3 is transition metal rich, in FIG. 3, the magnetization in S1 is a downward magnetization, and the magnetization in S7 is an upward magnetization. Thus, light-intensity modulation overwriting is also achieved in this case.

The third magnetic layer 5 smoothly copies the magnetization of the fourth magnetic layer 6 to the second magnetic layer 4 by adding the exchange force of the third magnetic layer 5 to the exchange force of the fourth magnetic layer 6 The magnetization of the third magnetic layer 5 is extinguished during the copying process of magnetization from the second magnetic layer 4 to the first magnetic layer 3. Therefore, the third magnetic layer 5 performs a function of preventing copying of magnetization from the fourth magnetic layer 6 to the second magnetic layer 4 during the process of copying magnetization from the second magnetic layer 4 to the first magnetic layer 3. As a result, since the requirements for magnetic properties such as the coercive forces and exchange forces of the first, second and fourth magnetic layers are eased, the materials for these magnetic layers can be selected from a wider range.

Samples of the magneto-optical disk of this embodiment will be described below.

Each of samples #1 and #2 uses disk-shaped glass with an outer diameter of 86 mm, an inner diameter of 15 mm and a thickness of 1.2 mm as the light transmitting substrate 1. Guide tracks for guiding a light beam are directly produced in the form of grooves and lands on one surface of the substrate 1 by reactive ion etching. The guide tracks were directly etched on the glass by reactive ion etching so as to achieve a track pitch of 1.6 $\mu$m, a groove width of 0.8 $\mu$m, and a land width of 0.8 $\mu$m.

On the surface of the substrate 1 whereupon the guide tracks were formed, a 80-nm-thick AlN film as the transparent dielectric layer 2 was formed by reactive sputtering, a 40-nm-thick DyFeCo film as the first magnetic layer 3 was formed by simultaneously sputtering Dy, Fe and Co targets, a 60-nm-thick GdFeCo film as the second magnetic layer 4 was formed by simultaneously sputtering Gd, Fe and Co targets, a 20-nm-thick DyFe film as the third magnetic layer 5 was formed by simultaneously sputtering Dy and Fe targets, a 40-nm-thick DyFeCo film as the fourth magnetic layer 6 was formed by simultaneously sputtering Dy, Fe and Co targets, and a 20-nm-thick AlN film as the protective layer 7 was layered.

The first magnetic layer 3 to fourth magnetic layer 6 were formed under the sputtering conditions of ultimate vacuum of not higher than $2.0\times10^{-4}$ Pa, Ar gas pressure of $6.5\times10^{-1}$ Pa, and discharge electric power of 300 W. The transparent dielectric layer 2 and the protective layer 7 were formed under the sputtering conditions of ultimate vacuum of not higher than $2.0\times10^{-4}$ Pa, $N_2$ gas pressure of $3.0\times10^{-1}$ Pa, and discharge electric power of 800 W.

Moreover, an overcoat film is formed by placing an acrylate-series ultraviolet curing resin over the protective layer 7 and curing the resin with ultraviolet irradiation.

The first magnetic layer 3 of #1 has a composition of $Dy_{0.20}(Fe_{0.85}Co_{0.15})_{0.90}$, is transition metal rich, has Curie point Tc1 of 180° C., and coercive force Hc1 of 1200 kA/m at room temperature.

The second magnetic layer 4 has a composition of $(Gd_{0.60}Dy_{0.40})_{0.28}(Fe_{0.70}Co_{0.30})_{0.72}$, is rare-earth metal rich, has Curie point Tc2 of 270° C., compensation point $T_{comp3}$ of 200° C., and coercive force Hc2 of 160 kA/m at room temperature.

The third magnetic layer 5 has a composition of $Dy_{0.18}Fe_{0.82}$, is transition metal rich, has Curie point Tc3 of 70° C., and coercive force Hc3 of 200 kA/m at room temperature.

The fourth magnetic layer 6 has a composition of $Dy_{0.22}(Fe_{0.90}Co_{0.10})_{0.78}$, is rare-earth metal rich, has Curie point Tc4 of 150° C., and coercive force Hc4 of 240 kA/m at room temperature.

The first magnetic layer 3 of #2 has a composition of $Tb_{0.20}(Fe_{0.92}CO_{0.08})_{0.30}$, is transition metal rich, has Curie point Tc1 of 180° C., and coercive force Hc1 of 1200 kA/m at room temperature.

The second magnetic layer 4 has a composition of $Tb_{0.25}(Fe_{0.80}C_{0.20})_{0.75}$, is rare-earth metal rich, has Curie point Tc2 of 270° C., no compensation point, and coercive force Hc2 of 160 kA/m at room temperature.

The third magnetic layer 5 has a composition of $Dy_{0.18}Fe_{0.82}$, is transition metal rich, has Curie point Tc3 of 70° C., and coercive force Hc3 of 200 kA/m at room temperature.

The fourth magnetic layer 6 has a composition of $Dy_{0.18}(Fe_{0.90}Co_{0.10})_{0.82}$, is rare-earth metal rich, has Curie point Tc4 of 150° C., and coercive force Hc4 of 240 kA/m at room temperature.

Recording was performed on magneto-optical disks of samples #1 and #2 under the conditions of Hw of 40 kA/m, Ph of 10 mW, Pl of 6 mW, Pr of 1 mW, and a recording bit length of 0.64 $\mu$m. As a result, light-intensity modulation overwriting was performed by completely erasing previous information, and a good signal to noise ratio (C/N) of 45 dB was achieved.

Embodiment 2

Figure 4:
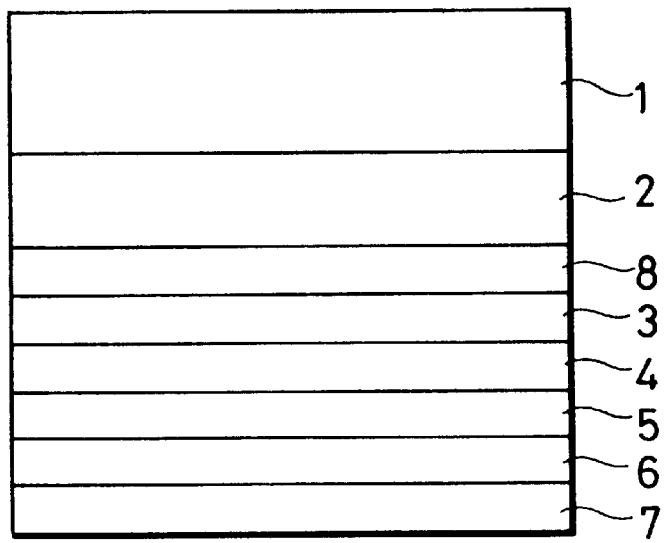
FIG. 4 is an explanatory view showing another example of the structure of a magneto-optical disk of the present invention.
Figure 5:
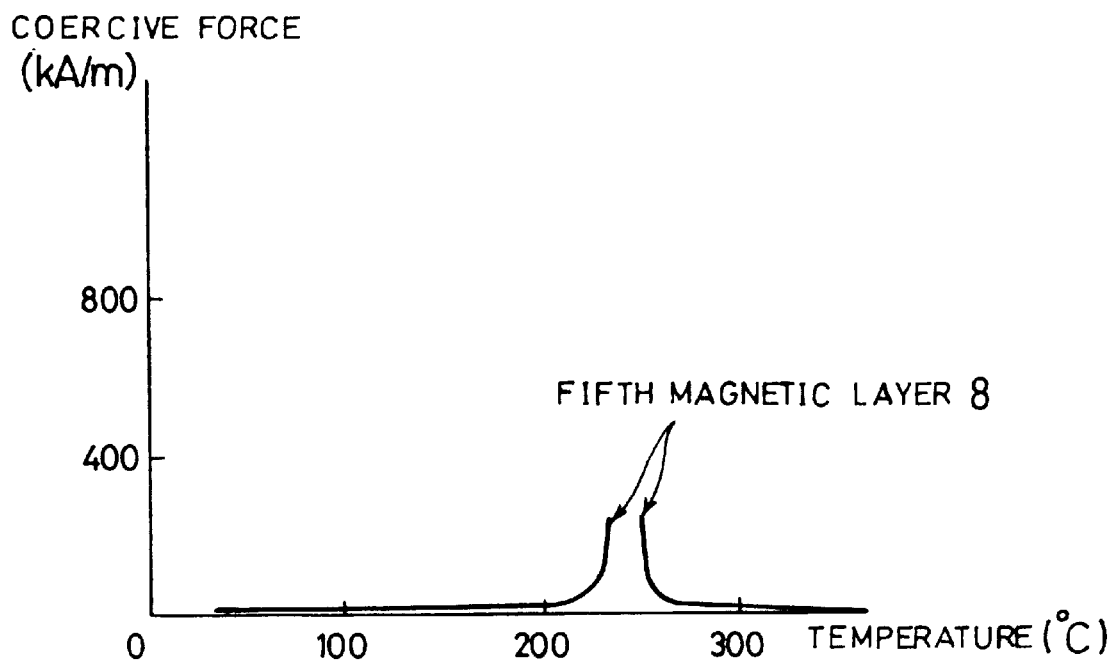
FIG. 5 is a graph showing the temperature dependence of the coercive force of the fifth magnetic layer of the magneto-optical disk shown in FIG. 4.
Figure 6:
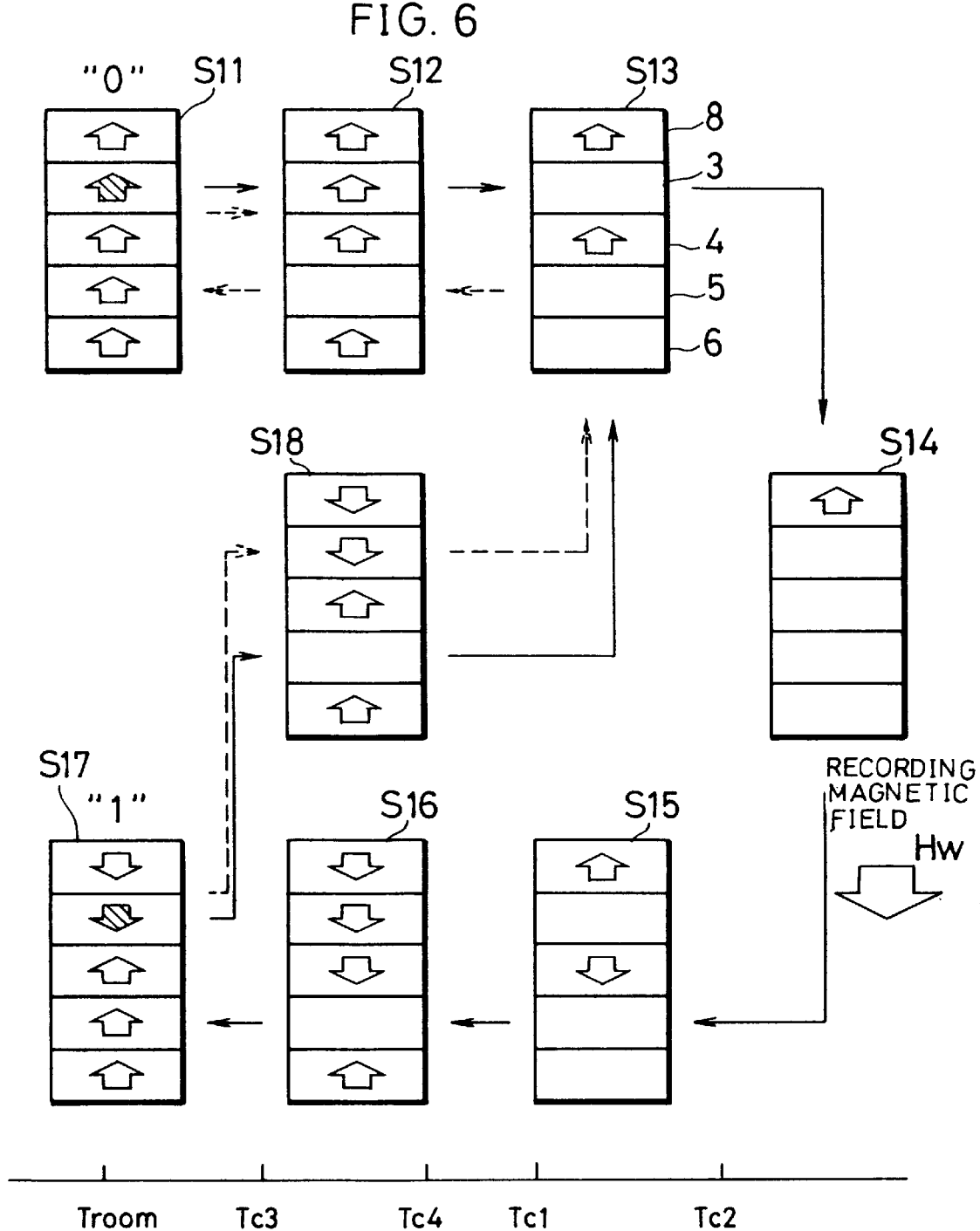
FIG. 6 is an explanatory view showing the magnetic states of the first to fifth magnetic layers to explain the recording process on the magneto-optical disk shown in FIG. 4.

The following description will discuss another embodiment of the present invention with reference to FIGS. 4 to 6. The members having the same function as in the above-mentioned embodiment will be designated by the same code and their description will be omitted.

The difference between the magneto-optical disk according to Embodiment 1 and a magneto-optical disk (magneto-optical recording medium) of this embodiment is that a fifth magnetic layer 8 is provided between the transparent dielectric layer 2 and the first magnetic layer 3 as shown in FIG. 4 in this embodiment.

As illustrated in FIG. 5, the fifth magnetic layer 8 has a Curie point, Tc5, higher than the Curie point Tc1 of the first magnetic layer 3, and shows perpendicular magnetic anisotropy from room temperature to Tc5.

Referring now to FIG. 6, the following description will discuss the recording process of this embodiment. FIG. 6 shows the magnetization states of the fifth magnetic layer 8, first magnetic layer 3, second magnetic layer 4, third magnetic layer 5, and fourth magnetic layer 6. The horizontal axis in FIG. 6 indicates temperature. Since each layer is formed by an alloy of rare-earth metal and transition metal, total magnetization, and sublattice magnetization of rare-earth metal/transition metal are present. The arrows shown in FIG. 6 indicate the sublattice magnetization $\alpha$ of the transition metal of each layer.

The magnetization states of the first magnetic layer 3, second magnetic layer 4, third magnetic layer 5 and fourth magnetic layer 6 are the same as those in the process of recording information on the magneto-optical disk of Embodiment 1 shown in FIG. 1, and therefore the explanation thereof will be omitted. Moreover, since the recording process in this embodiment is substantially the same as that on the magneto-optical disk of Embodiment 1 shown in FIG. 3, the same explanation will not be repeated.

The magnetization state of the fifth magnetic layer 8 accords with the magnetization of the first magnetic layer 3 at temperatures not higher than the Curie point Tc1 of the first magnetic layer 3.

In this embodiment, in a state S13 equivalent to the state S3 shown in FIG. 3, since the temperatures of the magnetic layers are not lower than the Curie point Tc1 of the first magnetic layer 3, the magnetization of the first magnetic layer 3 is extinguished. However, since the fifth magnetic layer 8 has the Curie point T5 higher than the curie point Tc1 of the first magnetic layer 3 as described above, the fifth magnetic layer 8 has magnetization at this temperature. Further, the fifth magnetic layer 8 still has magnetization in a state S14 where the temperature is higher than Tc2.

When each sublattice magnetization was copied from the second magnetic layer 4 to the first magnetic layer 3 in a state S16 in the course of lowering the temperature in the high process or a state S12 in the course of lowering the temperature in the low process, the sublattice magnetization is also copied from the first magnetic layer 3 to the fifth magnetic layer 8.

In the reproduction process, since the temperatures of the respective magnetic layers are not higher than Tc1, the same information as the information recorded on the first magnetic layer 3 is reproduced through the fifth magnetic layer 8.

A sample of such a magneto-optical disk will be described below.

A sample #3 of the magneto-optical disk includes a 30-nm-thick fifth magnetic layer 8 between the transparent dielectric layer 2 and the first magnetic layer 3, and was fabricated in the same method as the fabrication method of sample #1.

The fifth magnetic layer 8 of sample #3 has a composition of $Gd_{0.27}(Fe_{0.70}CO_{0.30})_{0.73}$, is rare-earth metal rich, has Curie point Tc5 higher than 300° C., and a compensation point up to 200° C.

Recording was performed on the magneto-optical disks of sample #3 under the same conditions as in Embodiment 1. As a result, light-intensity modulation overwriting was performed by completely erasing previous information, and a good signal to noise ratio (C/N) of 46.5 dB was achieved. Considering that the C/N ratio of sample #1 is 45 dB, it can be said that the signal quality was improved compared to sample #1. It is considered that the signal quality was improved because of an increase in the Kerr rotation angle achieved by setting Tc5>Tc1.

Embodiment 3

Figure 7:
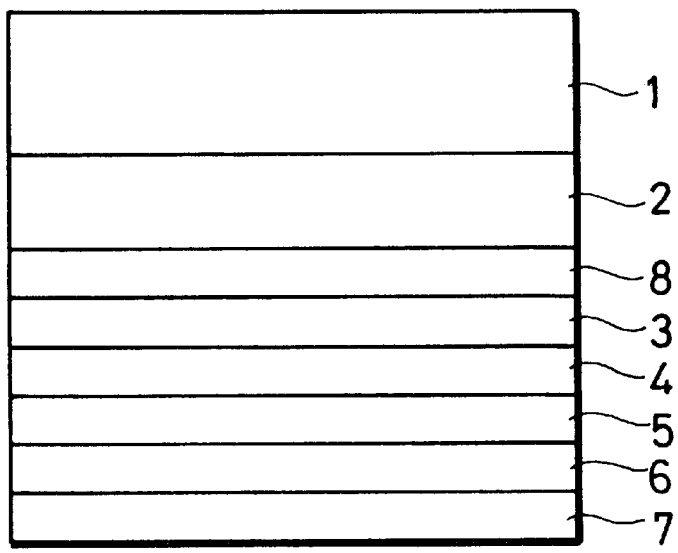
FIG. 7 is an explanatory view showing still another example of the structure of a magneto-optical disk of the present invention.
Figure 8:
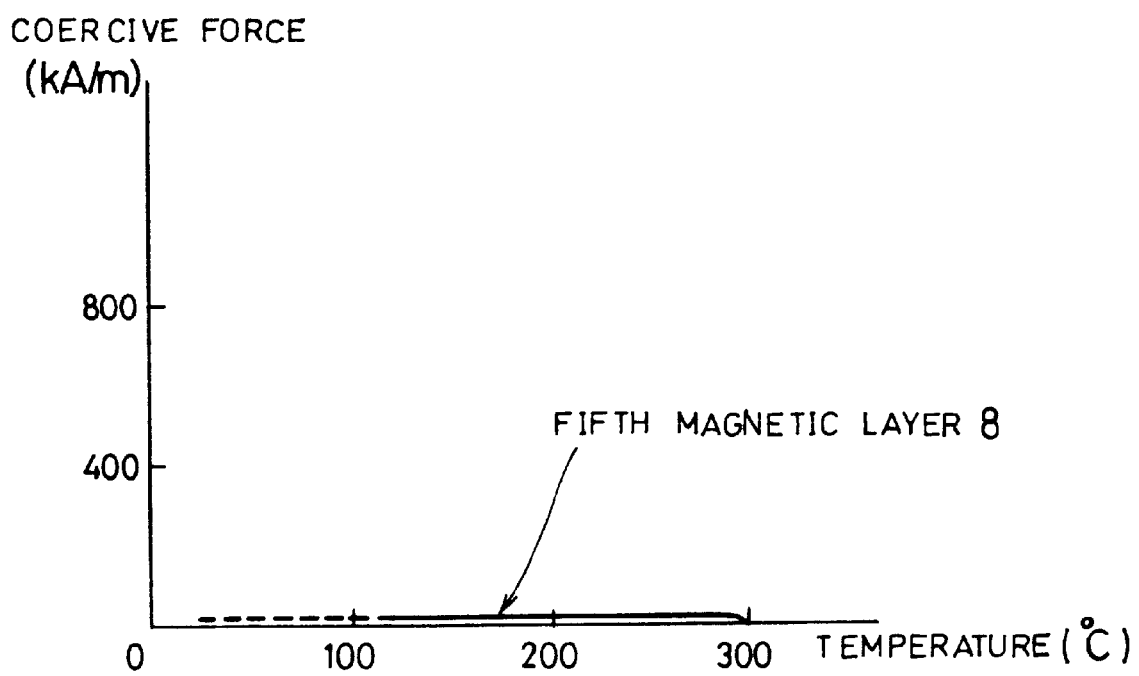
FIG. 8 is a graph showing the temperature dependence of the coercive force of the fifth magnetic layer of the magneto-optical disk shown in FIG. 7.
Figure 9:
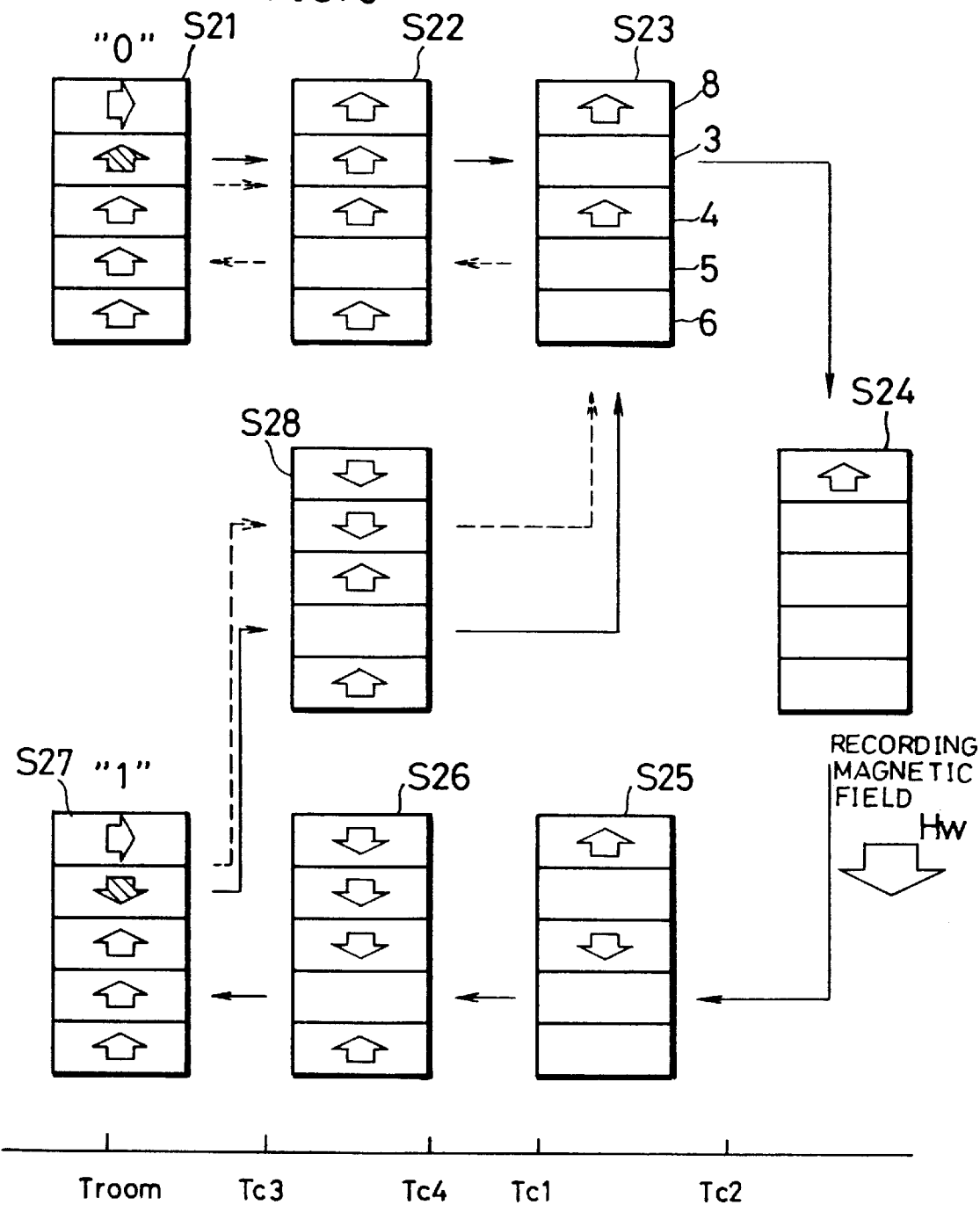
FIG. 9 is an explanatory view showing the magnetic states of the first to fifth magnetic layers to explain the recording process on the magneto-optical disk shown in FIG. 7.

The following description will discuss another embodiment of the present invention with reference to FIGS. 7 to 9. The members having the same function as in the above-mentioned embodiment will be designated by the same code and their description will be omitted.

The difference between the magneto-optical disks of the above-mentioned embodiments and a magneto-optical disk (magneto-optical recording medium) of this embodiment is that the fifth magnetic layer 8 is provided between the transparent dielectric layer 2 and the first magnetic layer 3 as shown in FIG. 7 in this embodiment.

As illustrated in FIG. 8, the fifth magnetic layer 8 has the Curie point Tc5 higher than the Curie point Tc1 of the first magnetic layer 3, coercive force Hc5 of substantially zero at room temperature, and shows in-plane magnetic anisotropy at room temperature and perpendicular magnetic anisotropy at temperatures not lower than a predetermined temperature (Tf).

Referring now to FIG. 9, the following description will discuss the recording process of this embodiment. FIG. 9 shows the magnetization states of the fifth magnetic layer 8, first magnetic layer 3, second magnetic layer 4, third magnetic layer 5, and fourth magnetic layer 6. The horizontal axis in FIG. 9 indicates temperature. Since each layer is formed by an alloy of rare-earth metal and transition metal, total magnetization and sublattice magnetization of rare-earth metal/transition metal are present. The arrows shown in FIG. 9 indicate the sublattice magnetization $\alpha$ of the transition metal of each layer.

The magnetization states of the first magnetic layer 3, second magnetic layer 4, third magnetic layer 5 and fourth magnetic layer 6 are the same as those in the process of recording information on the magneto-optical disk of Embodiment 1 shown in FIG. 3, and therefore the explanation thereof will be omitted. Since the recording process in this embodiment is substantially the same as that on the magneto-optical disk of Embodiment 2 shown in FIG. 6, the same explanation will not be repeated.

The magnetization state of the fifth magnetic layer 8 shows in-plane magnetic anisotropy at room temperature and perpendicular magnetic anisotropy at temperatures not lower than Tf. More specifically, in states S21 and S27 equivalent to the states S11 and S17 shown in FIG. 6, since the temperature is room temperature, the fifth magnetic layer 8 shows in-plane magnetization. In the states other than S21 and S27 in FIG. 6, the fifth magnetic layer 8 shows perpendicular magnetization. The magnetization state of the fifth magnetic layer 8 accords with the magnetization state of the first magnetic layer 3 at temperatures of not lower than Tf and not higher than the Curie point Tc1 of the first magnetic layer 3.

In the reproduction process, since the temperatures of the respective magnetic layers are between Tf and Tc1, the same information as the information recorded on the first magnetic layer 3 is reproduced through the fifth magnetic layer 8.

A sample of such a magneto-optical disk will be described below.

A sample #4 of the magneto-optical disk includes a 30-nm-thick fifth magnetic layer 8 between the transparent dielectric layer 2 and the first magnetic layer 3 of sample #1, and was fabricated in the same method as the fabrication method of sample #1.

The fifth magnetic layer 8 of sample #4 has a composition of $Gd_{0.29}(Fe_{0.30}Co_{0.20})_{0.71}$, is rare-earth metal rich, has Curie point Tc5 of 300° C., no compensation point, and shows perpendicular magnetic anisotropy at about 120° C.

Recording was performed on the magneto-optical disk of sample #4 under the same conditions as in Embodiment 1. As a result, light-intensity modulation overwriting was performed by completely erasing previous information, and a good signal to noise ratio (C/N) of 46 dB was achieved. Considering that the C/N ratio of sample #1 is 45 dB, it can be said that the signal quality was improved compared to sample #1. Like Embodiment 2, the signal quality was improved because of an increase in the Kerr rotation angle achieved by setting Tc5>Tc1.

In addition, when the recording bit length became shorter, the C/N ratio was abruptly lowered in sample #1, but it was not lowered much in sample #4. The reason for this would be that since the fifth magnetic layer 8 shows in-plane magnetic anisotropy at room temperature and shows perpendicular magnetization with the irradiation of laser light of reproducing laser power, even if a recording bit is short, reproduction can be performed without being affected by adjacent recording bits.

Embodiment 4

Figure 10:
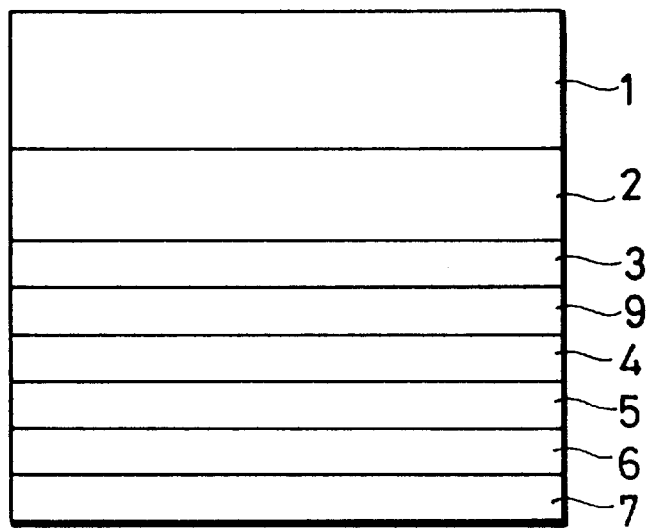
FIG. 10 is an explanatory view showing yet another example of the structure of a magneto-optical disk of the present invention.
Figure 11:
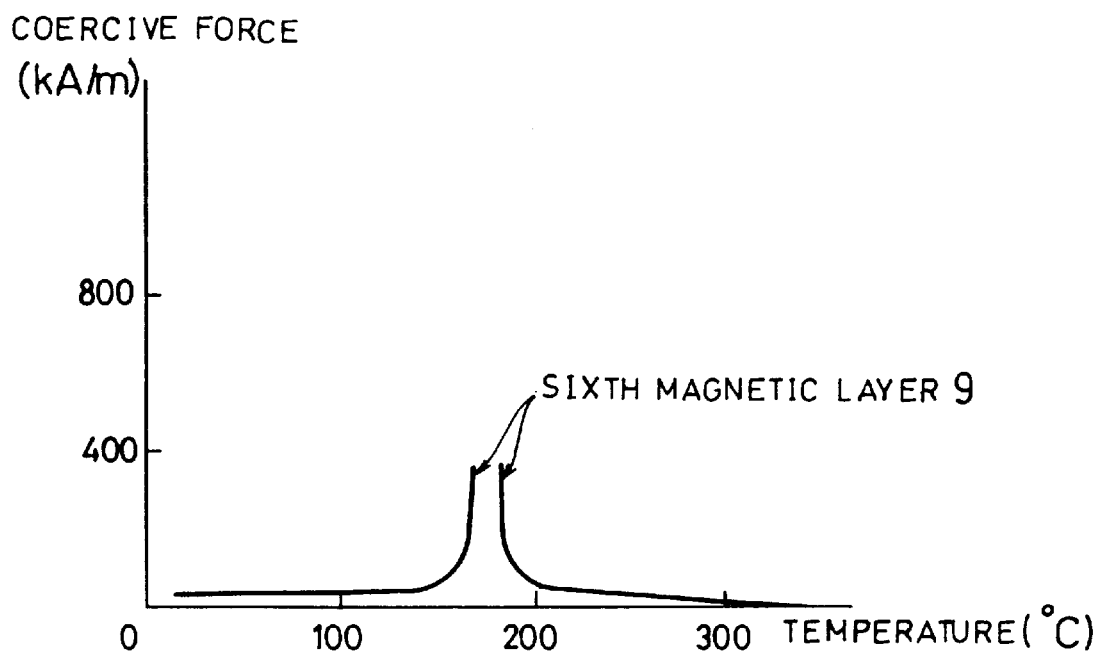
FIG. 11 is a graph showing the temperature dependence of the coercive force of the sixth magnetic layer of the magneto-optical disk shown in FIG. 10.
Figure 12:
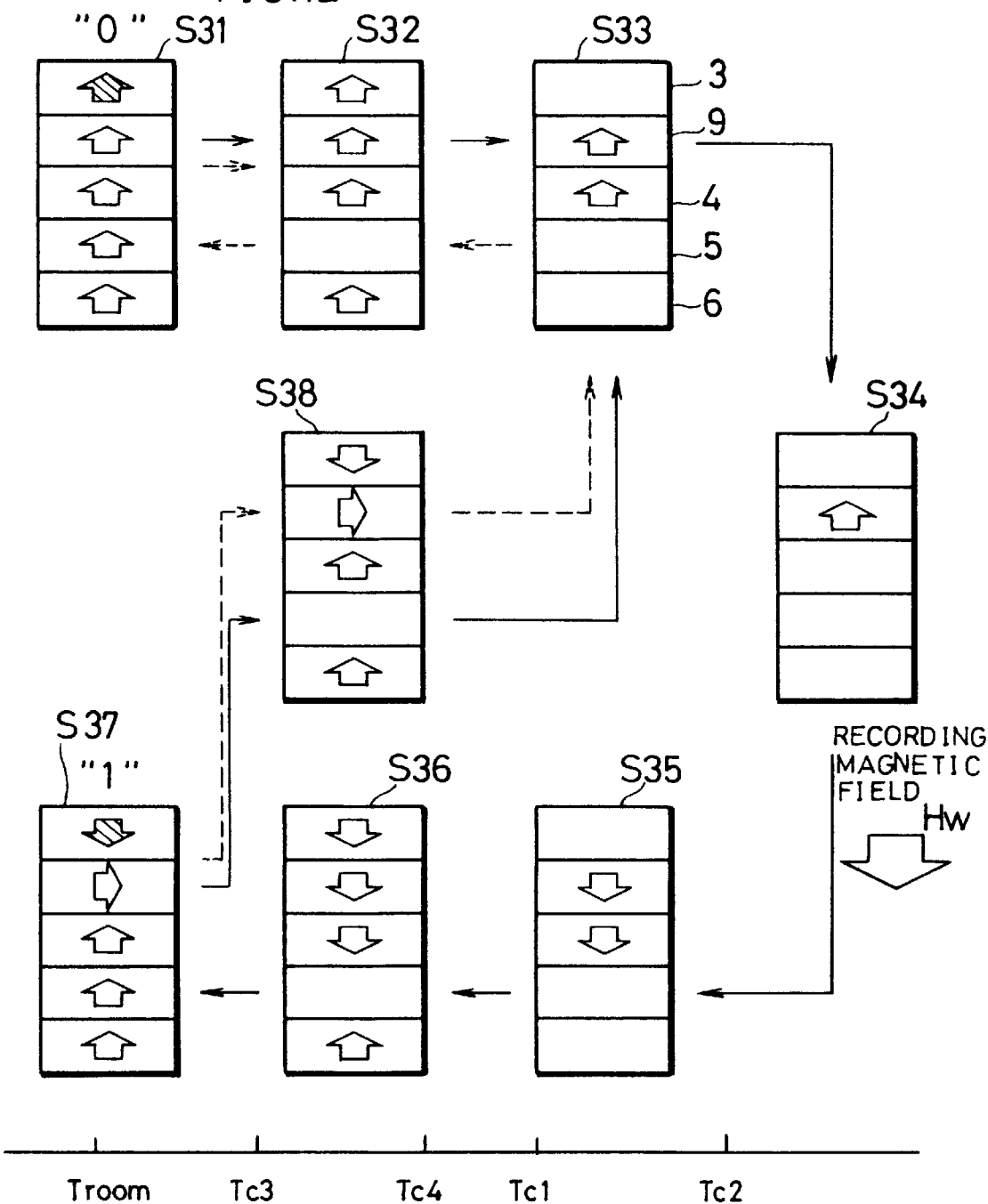
FIG. 12 is an explanatory view showing the magnetic states of the first to fourth and sixth magnetic layers to explain the recording process on the magneto-optical disk shown in FIG. 10.

The following description will discuss another embodiment of the present invention with reference to FIGS. 10 to 12. The members having the same function as in the above-mentioned embodiment will be designated by the same code and their description will be omitted.

The difference between the magneto-optical disks of the above-mentioned embodiments and a magneto-optical disk (magneto-optical recording medium) of this embodiment is that a sixth magnetic layer 9 is provided between the first magnetic layer 3 and the second magnetic layer 4 as shown in FIG. 10 in this embodiment.

As illustrated in FIG. 11, the sixth magnetic layer 9 has a coercive force Hc6 of substantially zero at room temperature, and shows very weak perpendicular or in-plane magnetic anisotropy at room temperature and perpendicular magnetic anisotropy at temperatures not lower than a predetermined temperature (Ts).

Referring now to FIG. 12, the following description will discuss the recording process of this embodiment. FIG. 12 shows the magnetization states of the first magnetic layer 3, sixth magnetic layer 9, second magnetic layer 4, third magnetic layer 5, and fourth magnetic layer 6. The horizontal axis in FIG. 12 indicates temperature. Since each layer is formed by an alloy of rare-earth metal and transition metal, total magnetization and sublattice magnetization of rare-earth metal/transition metal are present. The arrows shown in FIG. 12 indicate the sublattice magnetization α of the transition metal of each layer.

The magnetization states of the first magnetic layer 3, second magnetic layer 4, third magnetic layer 5 and fourth magnetic layer 6 are the same as those in the process of recording information on the magneto-optical disk of Embodiment 1 shown in FIG. 3, and therefore the explanation thereof will be omitted. Moreover, since the recording process in this embodiment is substantially the same as that on the magneto-optical disk of Embodiment 1 shown in FIG. 3, the same explanation will not be repeated.

The magnetization state of the sixth magnetic layer 9 shows very weak perpendicular magnetic anisotropy or in-plane magnetic anisotropy at room temperature and strong perpendicular magnetic anisotropy at temperatures not lower than Ts. Therefore, copying of magnetization from the second magnetic layer 4 to the first magnetic layer 3 is not readily performed at room temperature, and copying of magnetization from the second magnetic layer 4 to the first magnetic layer 3 is carried out at temperatures not lower than Ts. Therefore, as described below, the respective magnetization states become more stable, and light-intensity modulation overwriting is performed more smoothly compared to the magneto-optical disk of Embodiment 1.

In this embodiment, when copying the magnetization (each sublattice magnetization) from the second magnetic layer 4 to the first magnetic layer 3 in a state S36 in the course of lowering the temperature in the high process or a state S32 in the course of lowering the temperature in the low process, the sixth magnetic layer 9 functions as an intermediary and the direction of the sublattice magnetization is copied from the second magnetic layer 4 to the sixth magnetic layer 9. Then, the direction of the sublattice magnetization is copied from the sixth magnetic layer 9 to the first magnetic layer 3.

In the following state S37 of the high process and S38 in the course of increasing the temperature for next recording, the sublattice magnetization of the transition metal of the first magnetic layer 3 is oriented in a downward direction and the sublattice magnetization of the transition metal of the second magnetic layer 4 is oriented in an upward direction. Accordingly, the sublattice magnetization of the transition metal of the sixth magnetic layer 9 shows in-plane magnetization as a more stable direction.

On the other hand, in the following state S31 of the low process or S32 in which the temperature is increased from S31 where "0" is recorded, since the sublattice magnetization of the transition metal of the first magnetic layer 3 and the sublattice magnetization of the transition metal of the second magnetic layer 4 are oriented in an upward direction, the sublattice magnetization of the transition metal of the sixth magnetic layer 9 shows perpendicular magnetization in the same direction as a more stable direction.

In a state S34 equivalent to the state S4 shown in FIG. 3, since the temperatures of the respective magnetic layers are not lower than the Curie point Tc2 of the second magnetic layer 4, the magnetization of each of the first to fourth magnetic layers is extinguished. However, since the sixth magnetic layer 9 has the Curie point Tc6 higher than the Curie point Tc2, the sixth magnetic layer 9 has a magnetization at this temperature.

A sample of such a magneto-optical disk will be described below.

A sample #5 of the magneto-optical disk includes a 40-nm-thick sixth magnetic layer 9 between the first magnetic layer 3 and the second magnetic layer 4 of sample #1, and was fabricated in the same method as the fabrication method of sample #1.

The sixth magnetic layer 9 of sample #5 has a composition of $Gd_{0.27}(Fe_{0.70}Co_{0.30})_{0.73}$, is rare-earth metal rich, has Curie point Tc6 higher than 300° C., and a compensation point up to 200° C.

Recording was performed on the magneto-optical disk of sample #5 under the conditions of Hw of 32 kA/m, Ph of 9 mW, Pl of 1 mW, and a recording bit length of 0.64 µm. As a result, light-intensity modulation overwriting was performed by completely erasing previous information, and a good signal to noise ratio (C/N) of 45 dB was achieved. Considering that the recording conditions of sample #1 are Hw of 40 kA/m, Ph of 10 mW and Pl of 6 mW, the recording sensitivity was improved compared to sample #1. It is considered that such an improvement was achieved because light-intensity modulation overwriting was smoothly performed by inserting the sixth magnetic layer 9 between the first magnetic layer 3 and the second magnetic layer 4.

Embodiment 5

Figure 13:
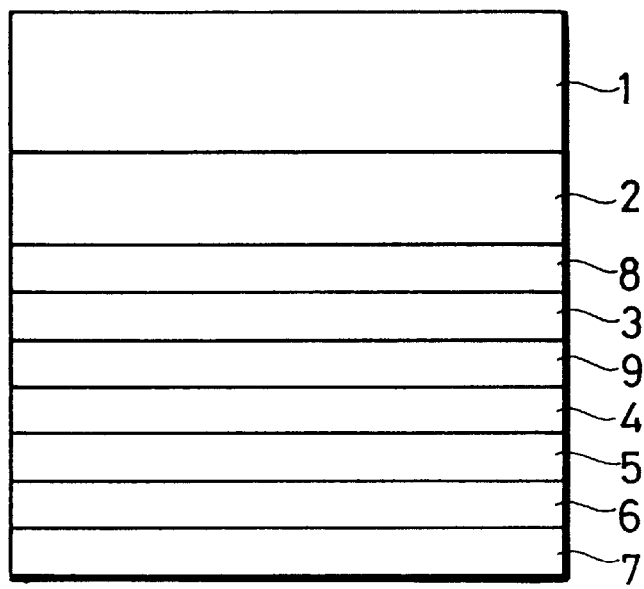
FIG. 13 is an explanatory view showing another example of the structure of a magneto-optical disk of the present invention.
Figure 14:
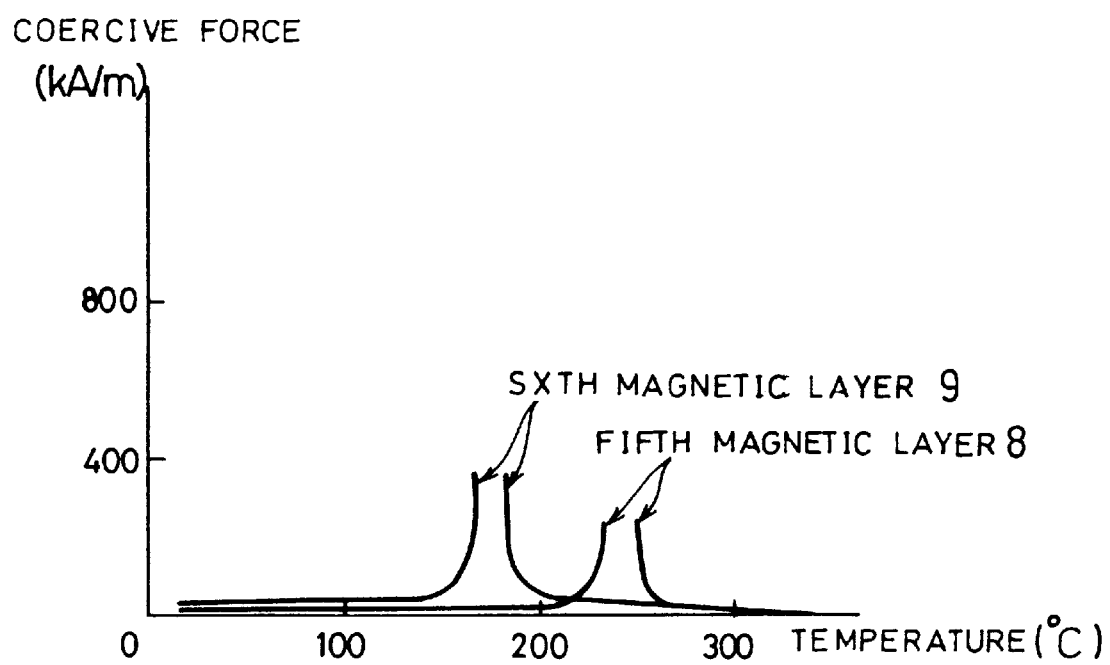
FIG. 14 is a graph showing the temperature dependence of the coercive forces of the fifth and sixth magnetic layers of the magneto-optical disk shown in FIG. 13.
Figure 15:
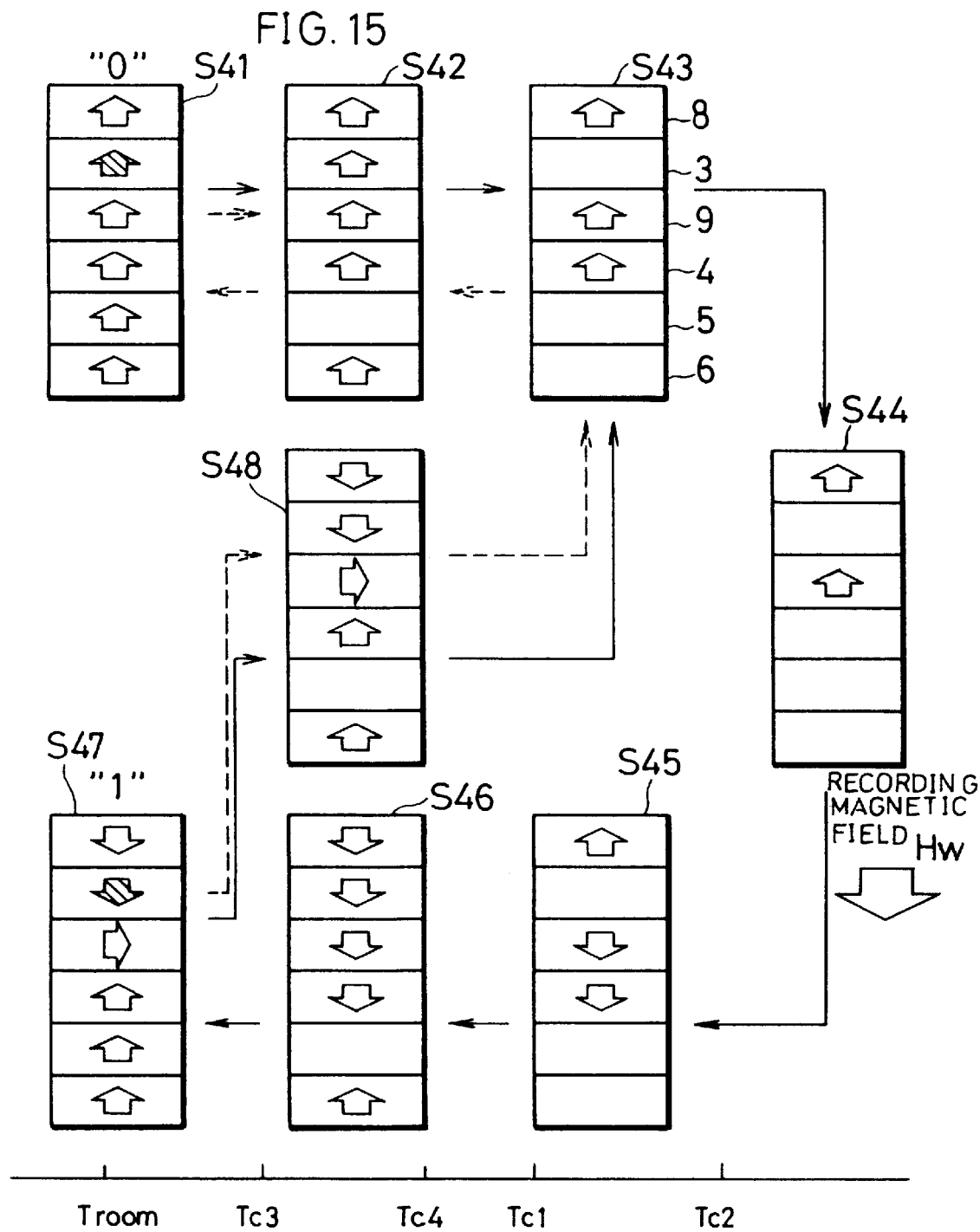
FIG. 15 is an explanatory view showing the magnetic states of the first to sixth magnetic layers to explain the recording process on the magneto-optical disk shown in FIG. 13.
Figure 16:
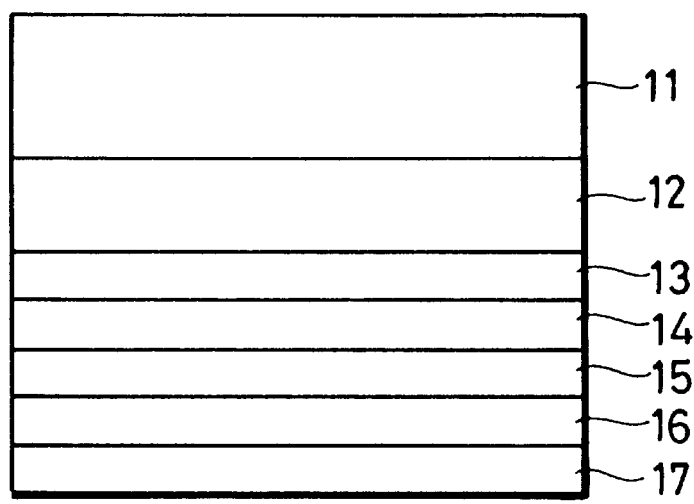
FIG. 16 is an explanatory view showing an example of the structure of a conventional magneto-optical disk.
Figure 17:
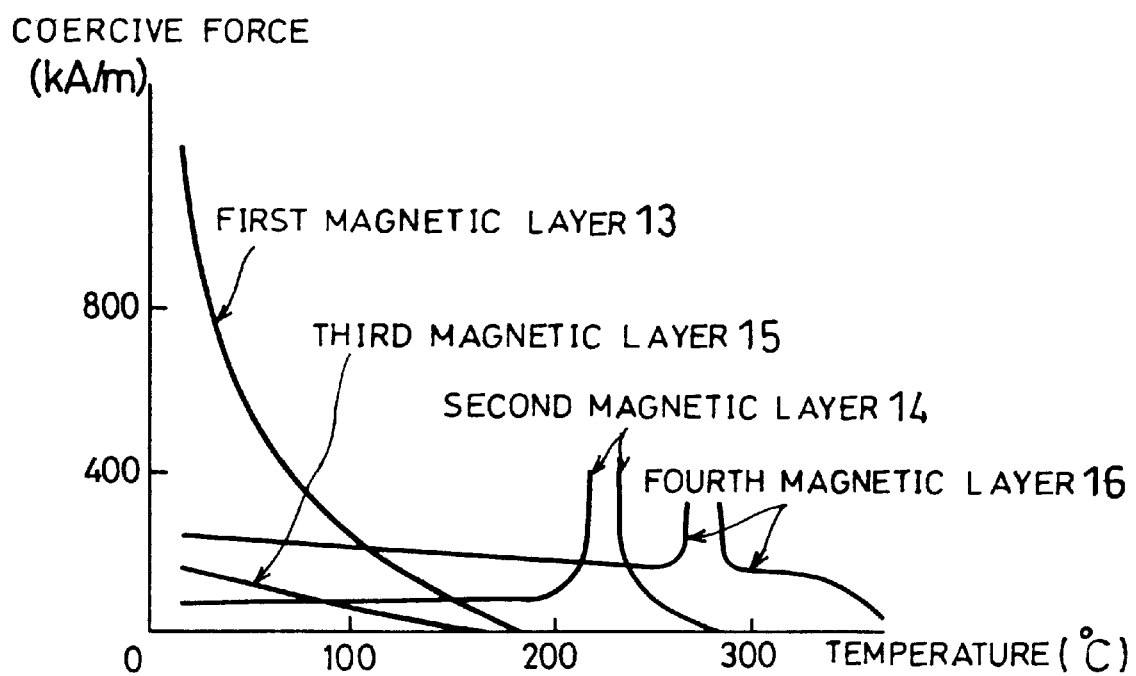
FIG. 17 is a graph showing the temperature dependence of the coercive forces of the first to fourth magnetic layers of the conventional magneto-optical disk.

The following description will discuss another embodiment of the present invention with reference to FIGS. 13 to 15. The members having the same function as in the above-mentioned embodiment will be designated by the same code and their description will be omitted.

The difference between the magneto-optical disks of the above-mentioned embodiments and a magneto-optical disk (magneto-optical recording medium) of this embodiment is that the fifth magnetic layer 8 is provided between the transparent dielectric layer 2 and the first magnetic layer 3 and the sixth magnetic layer 9 is provided between the first magnetic layer 3 and the second magnetic layer 4 as shown in FIG. 13 in Embodiment 5.

As illustrated in FIG. 14, the fifth magnetic layer 8 has Curie point Tc5 higher than the Curie point Tc1 of the first magnetic layer 3 and shows perpendicular magnetic anisotropy from room temperature to Tc5.

The sixth magnetic layer 9 has a coercive force Hc6 of substantially zero at room temperature, shows very weak perpendicular magnetic anisotropy or in-plane magnetic anisotropy at room temperature, and perpendicular magnetic anisotropy at temperatures not lower than the predetermined temperature Ts.

FIG. 15 shows the magnetization states of the fifth magnetic layer 8, first magnetic layer 3, sixth magnetic layer 9, second magnetic layer 4, third magnetic layer 5, and fourth magnetic layer 6. The horizontal axis in FIG. 15 indicates temperature. Since each layer is formed by an alloy of rare-earth metal and transition metal, total magnetization and sublattice magnetization of rare-earth metal/transition metal are present. The arrows shown in FIG. 15 indicate the sublattice magnetization α of the transition metal of each layer.

The magnetization states of the first magnetic layer 3, second magnetic layer 4, third magnetic layer 5 and fourth magnetic layer 6 are the same as those in the process of recording information on the magneto-optical disk of Embodiment 1 shown in FIG. 3, and therefore the explanation thereof will be omitted. Similarly, since the magnetization states of the fifth magnetic layer 8 and sixth magnetic layer 9 are the same as those in Embodiments 2 and 4, respectively, the explanation thereof will be omitted.

A sample of such a magneto-optical disk will be described below.

A sample #6 of the magneto-optical disk includes a 30-nm-thick fifth magnetic layer 8 between the transparent dielectric layer 2 and the first magnetic layer 3 of sample #1, and a 40-nm-thick sixth magnetic layer 9 between the first magnetic layer 3 and the second magnetic layer 4. The sample #6 was fabricated in the same method as the fabrication method of sample #1.

Recording was performed on the magneto-optical disk of sample #6 under the conditions of Hw of 32 kA/m, Ph of 9 mW, Pl of 4 mW, Pr of 1 mW, and a recording bit length of 0.64 µm. As a result, light-intensity modulation overwriting was performed by completely erasing previous information, and a good signal to noise ratio (C/N) of 46.5 dB was achieved. Considering that the recording conditions of sample #1 are Hw of 40 kA/m, Ph of 10 mW and Pl of 6 mW, the recording sensitivity was improved compared to sample #1. It is considered that such an improvement was achieved because light-intensity modulation overwriting was smoothly performed by inserting the sixth magnetic layer 9 between the first magnetic layer 3 and the second magnetic layer 4. In addition, considering that C/N ratio of sample #1 is 45 dB, the signal quality was improved compared to sample #1. It is considered that the signal quality was improved because of an increase in the Kerr rotation angle achieved by setting Tc5>Tc1.

In Embodiments 1 to 5 above, glass was used as the substrate 1 of samples #1 to #6. Alternatively, it is possible to use chemically reinforced glass, so-called 2P layered glass produced by forming a ultraviolet curing resin layer on the substrate 1, polycarbonate (PC), polymethyl methacrylate (PMMA), amorphous polyolefin (APO), polystyrene (PS), polyvinyl chloride (PVC), and epoxy as the substrate 1.

The thickness of the AlN film of the transparent dielectric layer 2 is not restricted to 80 nm. The film thickness of the transparent dielectric layer 2 is determined considering the enhancement of a so-called Kerr effect, i.e., an increase in the polar Kerr rotation angle from the first magnetic layer 3 or the fifth magnetic layer 8 by the interference effect of light when reproducing the magneto-optical disk. In order to maximize the C/N ratio during reproduction, it is necessary to increase the polar Kerr rotation angle. Therefore, the film thickness of the transparent dielectric layer 2 is set so as to increase the polar Kerr rotation angle.

The transparent dielectric layer 2 not only enhances the Kerr effect, but also prevents the oxidation of the first magnetic layer 3 to fourth magnetic layer 6, fifth magnetic layer 8 or sixth magnetic layer 9 of alloys of rare-earth metal and transition metal together with the protective layer 7.

Moreover, AlN permits reactive DC (direct current power source) sputtering using an Al target by introducing $N_2$ gas or a mixed gas of Ar and $N_2$, and has the advantage of faster film forming speed compared to RF (high frequency) sputtering.

Preferred examples of the material of the transparent dielectric layer 2 other than AlN include SiN, AlSiN, AlTaN, SiAlON, TiN, TiON, BN, ZnS, $TiO_2$, $BaTiO_3$, and $SrTiO_3$. Among these materials, SiN, AlSiN, AlTaN, TiN, BN and ZnS do not contain oxygen, thereby providing a magneto-optical disk of excellent moisture-proof characteristics.

The material and composition of the first magnetic layer 3 to fourth magnetic layer 6, fifth magnetic layer 8 or sixth magnetic layer 9 of alloys of rare-earth metal and transition metal are not restricted to those mentioned above. Similar effects can be produced by using an alloy made of at least one kind of rare-earth metal selected from the group consisting of Gd, Tb, Dy, Ho and Nd and at least one kind of transition metal selected from the group consisting of Fe and Co as the material for the first magnetic layer 3 to fourth magnetic layer 6, fifth magnetic layer 8 or sixth magnetic layer 9.

The resistance of the first magnetic layer 3 to fourth magnetic layer 6, fifth magnetic layer 8 or sixth magnetic layer 9 to environment can be improved by adding at least one kind of element selected from the group consisting of Cr, V, Nb, Mn, Be, Ni, Ti, Pt, Rh and Cu. It is thus possible to reduce the deterioration of the characteristics due to the oxidation caused by penetrated moisture or oxygen, and provide a magneto-optical disk that is reliable over a long period of time.

The film thickness of the first magnetic layer 3 to fourth magnetic layer 6, fifth magnetic layer 8 or sixth magnetic layer 9 of alloys of rare-earth metal and transition metal is not restricted to those mentioned above, and is determined depending on the material and composition thereof.

Although the thickness of the AlN film of the protective layer 7 was set to 80 nm in the embodiments, the film thickness is not necessarily restricted to this value. A preferred range of the film thickness of the protective layer 7 is between 1 nm and 200 nm.

The thermal conductivity of the protective layer 7 as well as the transparent dielectric layer 2 affects the recording sensitivity of the magneto-optical disk. The recording sensitivity indicates the degree of laser power necessary for recording or erasing. The light incident upon the magneto-optical disk mostly passes through the transparent dielectric layer 2, is absorbed by the first magnetic layer 3 to fourth magnetic layer 6, fifth magnetic layer 8 or sixth magnetic layer 9, and converted to heat. At this time, the heat of the first magnetic layer 3 to fourth magnetic layer 6, fifth magnetic layer 8 or sixth magnetic layer 9 is moved to the transparent dielectric layer 2 and the protective layer 7 by the conduction of heat. Accordingly, the thermal conductivity and heat capacity (specific heat) of the transparent dielectric layer 2 and the protective layer 7 affect the recording sensitivity.

This means that the recording sensitivity of the magneto-optical disk can be controlled to some extent by the film thickness of the protective layer 7. For example, a reduction of the film thickness of the protective layer 7 is necessary for the purpose of increasing the recording sensitivity (i.e., perform recording and erasing with low laser power). In general, in order to extend the life of the laser, a high recording sensitivity is advantageous and the protective layer 7 with a small film thickness is preferred.

Since AlN is suitable in this sense and has high resistance to moisture, the use of AlN as the protective layer 7 enables a reduction in the film thickness and a magneto-optical disk with high recording sensitivity. In this embodiment, when the protective layer 7 is formed by AlN that is used for the transparent dielectric layer 2, it is possible to provide a magneto-optical disk with high resistance to moisture. Moreover, since the protective layer 7 and the transparent dielectric layer 2 are formed by the same material, the productivity is improved.

Considering the above purpose and effects, preferred materials for the protective layer 7 are the above-mentioned materials used for the transparent dielectric layer 2, namely, SiN, AlSiN, AlTaN, SiAlON, TiN, TiON, BN, ZnS, $TiO_2$, $BaTiO_3$, and $SrTiO_3$. Among these materials, SiN, AlSiN, AlTaN, TiN, BEN and ZnS do not contain oxygen, thereby providing a magneto-optical disk of excellent moisture-proof characteristics.

Samples #1 to #6 of magneto-optical disk are generally called "single-sided disks". If the thin film section including the transparent dielectric layer 2, first magnetic layer 3 to fourth magnetic layer 6, fifth magnetic layer 8 or sixth magnetic layer 9, and protective layer 7 is referred to as a recording medium layer, a single-sided magneto-optical disk is constructed by the substrate 1, recording medium layer and overcoat layer.

On the other hand, a magneto-optical disk formed by positioning two pieces of substrates 1 whereon the recording medium layers are formed, respectively, to face each other and fastening them with an adhesive layer is called a "double-sided disk". A polyurethane series adhesive agent is particularly preferred as a material for the adhesive layer. This adhesive agent has a combination of three types of hardening functions, i.e., ultraviolet-hardening, thermosetting and anaerobic properties. Such a combination gives such an advantage that a portion shaded by the recording medium where ultraviolet rays do not pass is hardened by thermosetting and anaerobic hardening functions. It is thus possible to provide a magneto-optical disk which has very high resistance to moisture and excellent stability over a long period of time.

The thickness of the elements constituting the single-sided disk is a half of that of the double-sided disk, the single-sided disk is advantageous to, for example, a recording and reproducing device whose object is to reduce the size. On the other hand, the double-sided disk enables reproduction from both sides, and is therefore advantageous to, for example, a recording and reproducing device whose object is to increase the capacity.

In the above-mentioned embodiments, the magneto-optical disks are explained as an example of the magneto-optical recording medium. However, the present invention is also applicable to magneto-optical tapes and magneto-optical cards.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium comprising a first magnetic layer, a second magnetic layer and a fourth magnetic layer having Curie points Tc1, Tc2 and Tc4, respectively, and showing perpendicular magnetization from room temperature to the Curie points Tc1, Tc2, and Tc4, said first, second and fourth magnetic layers being arranged in this order, a direction of magnetization of said second magnetic layer being copied to said first magnetic layer by an exchange force at temperatures between room temperature and Tc1, a direction of magnetization of said fourth magnetic layer being copied to said second magnetic layer by an exchange force but magnetization of said second magnetic layer being not copied to said first magnetic layer in a predetermined temperature range R between room temperature and Tc4, said room temperature, Tc1, Tc2 and Tc4 being related by room temperature<Tc4<Tc1<Tc2, wherein said second and fourth magnetic layers are formed by alloys of rare-earth metal and transition metal as ferrimagnetic materials, if sublattice magnetization of one of the transition metal and the rare-earth metal is indicated as $\alpha$ and the other as $\beta$, $\alpha$ is stronger than $\beta$ in said second magnetic layer at temperature between Tc1 and Tc2, and $\beta$ is stronger than $\alpha$ in said fourth magnetic layer at temperatures between room temperature and Tc4.

2. The magneto-optical recording medium according to claim 1, wherein said first magnetic layer is made of an alloy of rare-earth metal and transition metal as ferrimagnetic material, and the sublattice magnetization of the transition metal is stronger than the sublattice magnetization of the rare-earth metal at temperatures between room temperature and Tc1.

3. The magneto-optical recording medium according to claim 1, wherein, in said second magnetic layer, the sublattice magnetization of the rare-earth metal is stronger than the sublattice magnetization of the transition metal at room temperature and the sublattice magnetization of the transition metal is stronger than the sublattice magnetization of the rare-earth metal at temperatures between Tc1 and Tc2, and in said fourth magnetic layer, the sublattice magnetization of the rare-earth metal is stronger than the sublattice magnetization of the transition metal at temperatures between room temperature and Tc4.

4. The magneto-optical recording medium according to claim 3, wherein said second magnetic layer has a compensation point between room temperature and Tc2.

5. The magneto-optical recording medium according to claim 4, wherein said compensation point is near Tc1.

6. The magneto-optical recording medium according to claim 1, wherein, in said second magnetic layer, the sublattice magnetization of the rare-earth metal is stronger than the sublattice magnetization of the transition metal at temperatures between room temperature and Tc2, and in said fourth magnetic layer, the sublattice magnetization of the transition metal is stronger than the sublattice magnetization of the rare-earth metal at temperatures between room temperature and Tc4.

7. The magneto-optical recording medium according to claim 1, wherein a third magnetic layer is provided between said second magnetic layer and said fourth magnetic layer, said third magnetic layer showing perpendicular magnetization from room temperature to its Curie point Tc3, Tc3 being related to room temperature and Tc4 by room temperature<Tc3<Tc4, said temperature range R is a range between room temperature and Tc3, and the magnetization of said fourth magnetic layer is copied to said third magnetic layer by an exchange force and the magnetization of said third magnetic layer is copied to said second magnetic layer by an exchange force in said temperature range R.

8. The magneto-optical recording medium according to claim 7, wherein, said third magnetic layer is made of an alloy of rare-earth metal and transition metal as ferrimagnetic material, and the sublattice magnetization of the transition metal is stronger than the sublattice magnetization of the rare-earth metal at temperatures between room temperature and Tc3.

9. A magneto-optical recording method using a magneto-optical recording medium including a first magnetic layer, a second magnetic layer and a fourth magnetic layer having Curie points Tc1, Tc2 and Tc4, respectively, and showing perpendicular magnetization from room temperature to the Curie points Tc1, Tc2, Tc4, the first, second and fourth magnetic layers being arranged in this order, where the room temperature ($T_{room}$), Tc1, Tc2 and Tc4 are related by $T_{room}$<Tc4<Tc1<Tc2, said method comprising the steps of:

a low process of irradiating a light beam of low level to heat the magneto-optical recording medium to a temperature near Tc1 and a high process of irradiating a light beam of high level for heating the magneto-optical recording medium to at least a temperature near Tc2 while applying a recording magnetic field Hw smaller than a coercive force of the second magnetic layer when a temperature of the magneto-optical recording medium is lower than Tc1;

wherein, said low process comprises the steps of:
(a)(1) heating the magneto-optical recording medium to a temperature near Tc1 so as to extinguish the magnetization of each of the first and fourth magnetic layers;
(a)(2) cooling the magneto-optical recording medium to a temperature between the temperature range R and Tc1 so as to copy a direction of magnetization of the second magnetic layer to the first magnetic layer by an exchange force; and
(a)(3) cooling the magneto-optical recording medium to a temperature in the temperature range R so as to align a direction of magnetization of the fourth magnetic layer with a direction of the recording magnetic field Hw, and wherein said high process comprises the steps of:
(b)(1) heating the magneto-optical medium to at least a temperature near Tc2 so as to extinguish magnetization of each of the first, second and fourth magnetic layers;
(b)(2) cooling the magneto-optical recording medium to a temperature between Tc1 and Tc2 so as to align the direction of magnetization of the second magnetic layer with the direction of the recording magnetic field Hw;
(b)(3) cooling the magneto-optical recording medium to a temperature between Tc4 and Tc1 so as to copy the direction of magnetization of the second magnetic layer to the first magnetic layer by an exchange force; and
(b)(4) cooling the magneto-optical recording medium to a temperature in the temperature range R so as to align a direction of magnetization of the fourth magnetic layer with the direction of the recording magnetic field Hw and align a direction of each sublattice magnetization of the second magnetic layer with a direction of each sublattice magnetization of the fourth magnetic layer.

10. The magneto-optical recording method according to claim 9, wherein the magneto-optical recording medium being used further includes a third magnetic layer provided between the second and fourth magnetic layers, the third magnetic layer showing perpendicular magnetization from room temperature to its Curie point Tc3, where the temperature range R is a range between room temperature and Tc3, and where Tc3 is related to room temperature and Tc4 by room temperature<Tc3<Tc4; and wherein, when the magneto-optical recording medium is cooled down to a temperature in the temperature range R during said high process, the direction of magnetization of the fourth magnetic layer is copied to the third magnetic layer by an exchange force, and a direction of magnetization of the third magnetic layer is copied to the second magnetic layer by an exchange force.

* * * * *